United States Patent
Kimura

(10) Patent No.: US 8,355,586 B2
(45) Date of Patent: Jan. 15, 2013

(54) DECODING APPARATUS, DEQUANTIZING METHOD, DISTRIBUTION DETERMINING METHOD, AND PROGRAM THEREOF

(75) Inventor: Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 320 days.

(21) Appl. No.: 12/659,574

(22) Filed: Mar. 12, 2010

(65) Prior Publication Data

US 2010/0189371 A1    Jul. 29, 2010

Related U.S. Application Data

(62) Division of application No. 11/179,988, filed on Jul. 13, 2005, now Pat. No. 7,715,636.

(30) Foreign Application Priority Data

Mar. 23, 2005  (JP) ................................. 2005-084085

(51) Int. Cl.
*G06K 9/00* (2006.01)

(52) U.S. Cl. ... 382/232; 382/248; 382/251; 375/240.18; 375/240.22; 348/14.13; 386/328; 708/203; 708/400

(58) Field of Classification Search ........................ None
See application file for complete search history.

(56) References Cited

U.S. PATENT DOCUMENTS

| | | | |
|---|---|---|---|
| 4,885,636 A * | 12/1989 | Sullivan | 375/240.14 |
| 5,125,042 A * | 6/1992 | Kerr et al. | 382/300 |
| 5,136,374 A * | 8/1992 | Jayant et al. | 375/240.11 |
| 5,495,538 A | 2/1996 | Fan | |
| 5,608,654 A | 3/1997 | Matsunoshita | |
| 5,615,288 A | 3/1997 | Koshi et al. | |
| 5,724,097 A * | 3/1998 | Hibi et al. | 375/240.04 |
| 5,768,425 A | 6/1998 | Praveen et al. | |
| 5,778,102 A | 7/1998 | Sandford et al. | |
| 5,787,204 A | 7/1998 | Fukuda | |
| 5,822,463 A * | 10/1998 | Yokose et al. | 382/251 |
| 5,828,789 A | 10/1998 | Yokose et al. | |
| 5,930,394 A * | 7/1999 | Kondo et al. | 382/232 |
| 6,072,909 A | 6/2000 | Yokose et al. | |
| 6,157,741 A | 12/2000 | Abe et al. | |
| 6,205,254 B1 * | 3/2001 | Koshi et al. | 382/239 |
| 6,301,368 B1 | 10/2001 | Bolle et al. | |
| 6,510,252 B1 | 1/2003 | Kishimoto | |

(Continued)

FOREIGN PATENT DOCUMENTS

CN    1286575 A    3/2001

(Continued)

OTHER PUBLICATIONS

Taubman et al., "JPEG 2000: Image Compression Fundamentals, Standards, and Practice," 2002, Kluwer Academic Publishers, pp. 98-101.*

Lam et al., "A Mathematical Analysis of the DCT Coefficient Distributions for Images," Oct. 2000, IEEE, vol. 9, pp. 1661-1666.*

(Continued)

*Primary Examiner* — John Lee
(74) *Attorney, Agent, or Firm* — Oliff & Berridge, PLC

(57) ABSTRACT

A decoding apparatus includes a random number generating section and a decoding section. The random number generating section generates random numbers according to distribution of original data corresponding to respective quantization indexes. The decoding section generates decoded data on a basis of the random numbers generated by the random number generating section.

6 Claims, 17 Drawing Sheets

U.S. PATENT DOCUMENTS

| | | |
|---|---|---|
| 6,552,822 B1 | 4/2003 | Kishimoto |
| 6,748,113 B1 | 6/2004 | Kondo et al. |
| 6,996,282 B1 | 2/2006 | Kondo et al. |
| 7,200,277 B2 | 4/2007 | Joshi et al. |
| 2002/0009209 A1 | 1/2002 | Inoue et al. |
| 2002/0081035 A1 | 6/2002 | Bright et al. |
| 2002/0085679 A1 | 7/2002 | Zastrow et al. |
| 2003/0007693 A1 | 1/2003 | Yokose et al. |
| 2003/0026477 A1* | 2/2003 | Ishiga .................. 382/166 |
| 2003/0215111 A1 | 11/2003 | Zhang et al. |
| 2005/0271284 A1 | 12/2005 | Chen et al. |
| 2006/0045361 A1 | 3/2006 | Yokose |
| 2006/0133686 A1 | 6/2006 | Gomila et al. |
| 2006/0153402 A1 | 7/2006 | Suzuki et al. |

FOREIGN PATENT DOCUMENTS

| | | |
|---|---|---|
| JP | A 05-14735 | 1/1993 |
| JP | A 05-316361 | 11/1993 |
| JP | A-06-054293 | 2/1994 |
| JP | A 07-336684 | 12/1995 |
| JP | 2000-224045 A | 8/2000 |
| JP | 2003-250137 A | 9/2003 |
| JP | A-2004-080741 | 3/2004 |
| JP | 2004-163696 A | 6/2004 |
| JP | 2004-260539 A | 9/2004 |
| WO | WO 2005/020858 A1 | 3/2005 |

OTHER PUBLICATIONS

International Telecommunication Union, "Terminal Equipment and Protocols for Telematic Services: Information Technology—Digital Compression and Coding of Continuous-Tone Still Images-Requirements and Guidelines", T. 81, (Sep. 1992).

International Telecommunication Union, "Series T: Terminals for Telematic Services—Information Technology—JPEG 2000 Image Coding System: Core Coding System," T. 800, (Aug. 2002).

Heeger et al., "Pyramid-Based Texture Analysis/Synthesis," *Computer Graphics*, pp. 229-238, SIGGRAPH 95 (1995).

U.S. Appl. No. 11/151,212, filed Jun. 14, 2005, Shunichi Kimura.

U.S. Appl. No. 11/153,395, filed Jun. 16, 2005, Shunichi Kimura.

U.S. Appl. No. 11/172,967, filed Jul. 5, 2005, Shunichi Kimura.

U.S. Appl. No. 11/168,920, filed Jun. 29, 2005, Shunichi Kimura.

Allen Gersho et al.; "The Optical Decoder for a Given Encoder"; Vector Quantization and Signal Compression; pp. 177-178; 1992.

Kégl et al., "Learning and Design of Principal Curves," IEEE Transactions on Pattern Analysis and Machine Intelligence, vol. 22, No. 3, 2000, pp. 281-297.

Taubman et al., "JPEG2000—Image Compression Fundamentals, Standards and Practice," Kluwer Academic Publishers, 2002, pp. 14, 97-99 and 481-484.

Office Action issued in U.S. Appl. No. 12/659,571 on Jul. 19, 2010.

Office Action issued in U.S. Appl. No. 12/659,571 on Dec. 10, 2010.

* cited by examiner

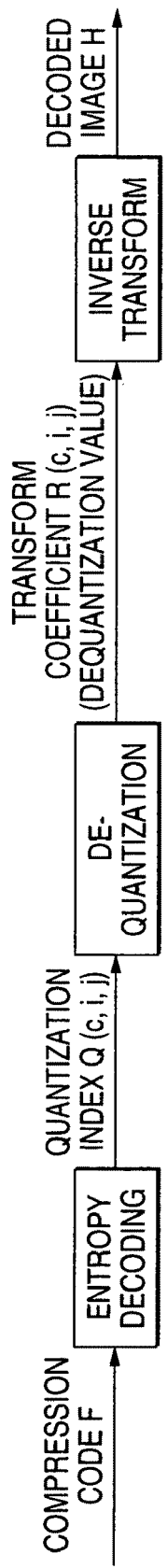
FIG. 1A CODING PROCESS
FIG. 1B DECODING PROCESS

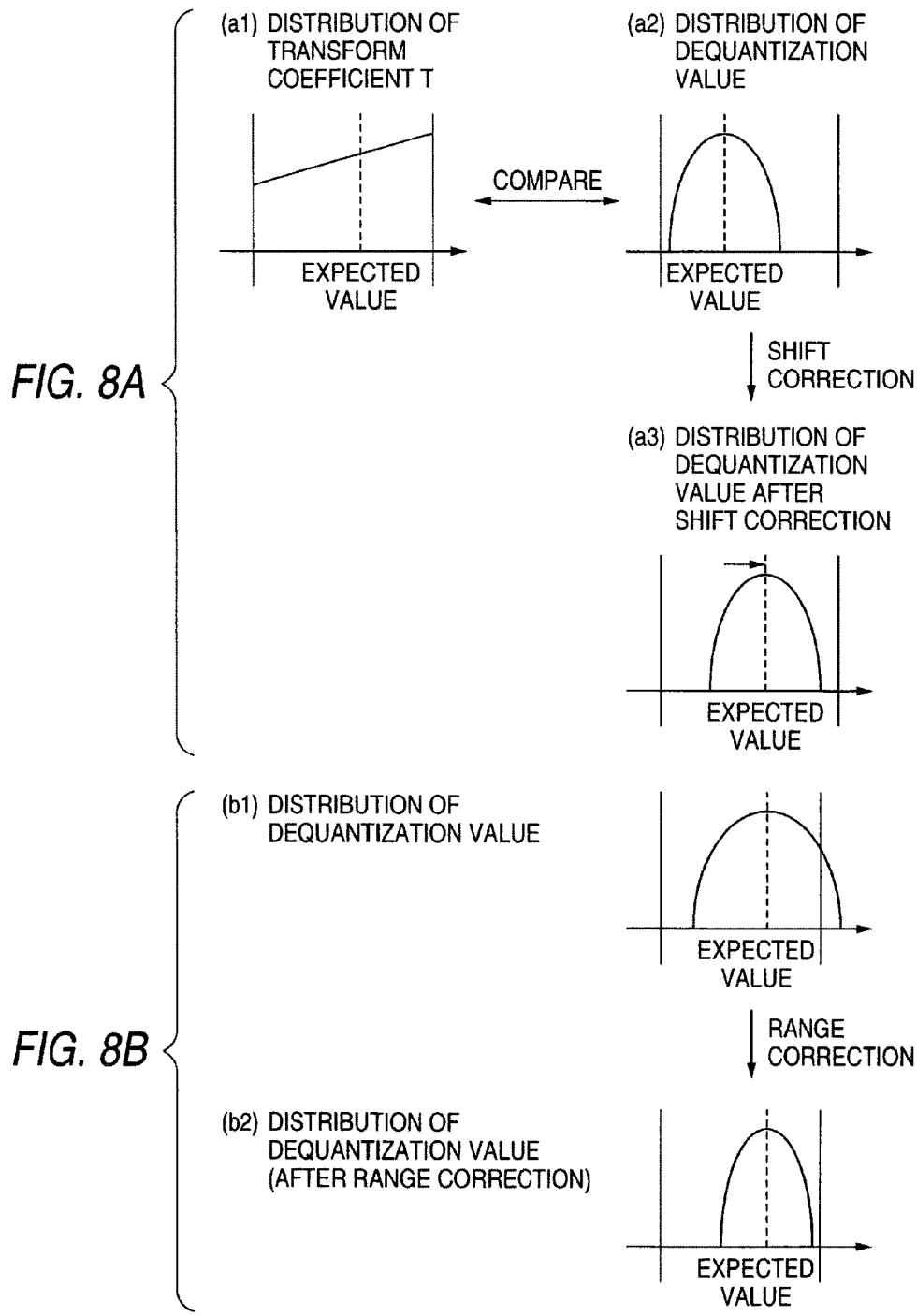

FIG. 10

| 1/16 | 1/16 | 1/16 |
|------|------|------|
| 1/16 | 0    | 1/16 |
| 1/16 | 1/16 | 1/16 |

FIG. 12

| 3LL | 3HL | 2HL | 1HL |
|---|---|---|---|
| 3LH | 3HH | | |
| 2LH | 2HH | | |
| 2LH | | 1HH | |

N VALUE DETERMINING PROCESS

DECODING APPARATUS, DEQUANTIZING METHOD, DISTRIBUTION DETERMINING METHOD, AND PROGRAM THEREOF

This is a Division of application Ser. No. 11/179,988 filed Jul. 13, 2005. The disclosure of the prior application is hereby incorporated by reference herein in its entirety.

BACKGROUND OF THE INVENTION

Field of the Invention

The invention relates to a decoding apparatus for decoding code data generated by an encoding process. More specifically, the invention relates to a decoding apparatus for dequantize code data generated by an encoding process including quantizing data, to decode the code data.

Since images, audios or the like have enormous amount of data, it is common to reduce an amount of the data by compressing it and then store or transmit the compressed data. For example, an amount of multi-value image data generated when color documents or photographs are transformed into an electronic form by a scanner or when scenery is photographed by a digital camera can be significantly reduced by compressing the data using a lossy coding process such as JPEG, JPEG200 or the like.

However, the lossy coding process causes coding distortion; this is a problem. In particular, the JPEG process has a problem in that block distortion occurs at DCT block boundaries of decoded images (coding distortion).

In this connection, a generation mechanism for the coding distortion of the lossy coding process will be first described.

FIGS. 1A and 1B are block diagrams schematically illustrating a transform coding method such as JPEG and JPEG2000, where FIG. 1A shows an outline of an encoding process and FIG. 1B shows an outline of a decoding process.

FIGS. 2A to 2C are diagrams illustrating a quantization process in the transform coding method. A transform coefficient T(c, i, j) and a quantization index Q(c, i, j) shown in FIGS. 1A and 1B are functions of variables c, i and j. The variable c is an index indicating a kind of transform coefficient. For example, in the case of the DCT transform using 8×8 blocks, the variable c is a value (an integer in a range of 1 to 64) indicating one of 64 (8×8) transform coefficients. In a case of the wavelet transform, the variable c is a value indicating one of components such as 1HH, 1LH, 1HL, 2HH, 2LH, 2HL, . . . , NLL. In addition, the transform variables i and j are variables indicating positions of the transform coefficients, respectively. For example, in the case of the DCT transform, a c-th transform coefficient in a block located at an i-th row from the top and a j-th column from the left is indicated as T(c, i, j). In the case of the wavelet transform, data of a c-th transform coefficient located at an i-th row from the top and a j-th column from the left is indicated as T (c, i, j).

As shown in FIG. 1A, in an encoding process of the transform coding method, an input image G is subject to a transform process such as the discrete cosine transform (DCT) or the wavelet transform to generate a transform coefficient T of the input image G. The transform coefficient T is then quantized into a quantization index Q. The quantization index Q is subject to an entropy coding process (lossless coding process) to be a compression code F.

Here, the quantization index refers to information used to distinguish quantization values. In addition, the quantization value refers to a value to which a group of numerical values within a specific range (quantization interval) are degenerated. For example, as shown in FIGS. 2A to 2C, the quantization values are discrete values (−2×D(c) to 2×D(c) in this example) representing quantization intervals (A-2~A2), respectively.

Code data (the compression code F) generated in this way are entropy-decoded into a quantization index Q, as shown in FIG. 1B. This quantization index Q is equivalent to the quantization index Q in the encoding process.

Then, the quantization index Q is dequantized into a transform coefficient R (i.e., a dequantization value). Thereafter, the transform coefficient R is inversely transformed to generate a decoded image H.

Here, the dequantization value refers to a value, which is generated based on the quantization index or the quantization value and is used for decoding of data. For example, the dequantization value is a transform coefficient of the JPEG or JPEG2000 (transform coefficient being associated with a quantization index).

In the above-described process, coding distortion occurs during the quantization. In general, precision of the transform coefficient T of an original image is higher than that of the quantization index Q. Accordingly, the transform coefficient R reproduced by using the quantization index Q may be different from the original transform coefficient T. This is the cause of the coding distortion.

Next, the quantization and the dequantization will be described in detail with reference to FIGS. 2A to 2C.

The quantization is performed using a quantization step width D(c) prepared for each transform coefficient c. The quantization step width D(c) is a function of the kind of transform coefficient c. For example, in the case of JPEG, the quantization index Q is calculated according to the following equation in the quantization.

$$Q(c,i,j)=\text{round}(T(c,i,j)/D(c))$$

Where "round( )" is a function outputting an integer closest to an input value.

In addition, the dequantization value R is calculated according to the following equation in the dequantization.

$$R(c,i,j)=Q(c,i,j){\times}D(c)$$

In the case of JPEG2000, the quantization index Q and the dequantization value R are calculated according to the following equations.

$$Q(c,i,j)=\text{sign}(T(c,i,j)){\times}\text{floor}(|T(c,i,j)|/D(c))$$

$$R(c,i,j)=(Q(c,i,j)+r){\times}D(c), \text{ if } Q(c,ij)>0$$

$$R(c,i,j)=(Q(c,i,j)-r){\times}D(c), \text{ if } Q(c,i,j)<0$$

$$R(c,i,j)=0, \text{ if } Q(c,i,j)=0$$

Where, "sign ( )" is a function outputting positive sign or negative sign, "floor ( )" is a function nulling decimal places, and "||" is a symbol representing an absolute value.

In addition, "r" is a numerical value in a range of 0 to 1, typically r=0.5. In the JPEG2000, there may be a case where lower bits are not encoded. Here, a case where all bits including the least significant bit are encoded will be described by way of examples. Alternatively, in the JPEG2000, it is possible to obtain number of bits, which are not encoded in the encoding, from a code stream in the decoding. Accordingly, by shifting the quantization step width D to the left by the number of bits and setting the shifted quantization step width as a new quantization width, the JPEG2000 may have the same operation as the JPEG.

As shown in FIG. 2A, in the encoding process of the JPEG, transform coefficients T (before the quantization) generated by the transform process performed for the input image G are distributed on an X axis, which is a numerical straight line.

If a transform coefficient T exists in a quantization interval A0, the quantization index Q becomes 0 by the quantization process. Similarly, if a transform coefficient T exists in a quantization interval Aq, the quantization index Q becomes q.

Then, when the dequantization is performed for the quantization index Q, in a case in which the quantization index Q is 0, the dequantization value R of 0 is generated by the dequantization process. In a case in which the quantization index Q is 1, the dequantization value R of D(c) is generated.

Similarly, in the JPEG2000, as shown in FIG. 2B, if a transform coefficient T exists in a quantization interval Aq, the quantization index Q becomes q. Then, when the dequantization is performed for the quantization index Q, dequantization values corresponding to quantization indexes Q in a one-to-one manner are generated.

Here, for the sake of simplicity, only the quantization interval Aq in which the quantization index Q becomes q will be considered.

It is assumed that the transform coefficient T exists in the quantization interval Aq.

As shown in FIG. 2C, the quantization interval Aq has a range of d1 to d2. In this case, the transform coefficient T is included in the range of d1 to d2. In addition, it is assumed that a dequantization value of the transform coefficient T is R.

Under this condition, a transform coefficient for generating a decoded image is the dequantization value R. However, the transform coefficient T of an original image has any value within the range of d1 to d2 and is not always equivalent to the dequantization value R. At this time, a difference between the original transform coefficient T and the dequantization value R occurs. This difference is the cause of the coding distortion.

As described previously, the lossy coding process realizes a lossy data compression by degenerating a plurality of data values (original data values existing in each quantization interval) into one quantization value (a quantization value corresponding to each quantization interval), but at the same time, the coding distortion occurs due to the quantization.

In order to reduce this coding distortion, a parameter for reducing compression efficiency in the encoding process may be selected.

However, this causes a problem that encoding efficiency is reduced and the amount of data is increased.

Further, when previously encoded data is intended to be high-quality images, it is impossible to employ such a process in which the compression efficiency is reduced.

For this reason, various techniques have been suggested for overcoming the image distortion problem in the decoding process.

In a broad classification, there are two types of method, that is, a filtering method and a noise method. In the filtering method, a decoded image is subject to a lowpass filtering process so as to make coding distortion faint and be conspicuous. In the noise method, noises are added to the decoded image or the transformation coefficient so as to make coding distortion faint and be conspicuous.

First, the method using the low pass filtering process (the filtering method) will be described.

For example, it is known to provide a method applying a low pass filter to only a boundary between DCT blocks in order to remove block distortion.

This method makes the coding distortion faint using the low pass filter so that it is difficult for this distortion to be discriminated.

However, this method has a problem in that edge components of an original image become faint as well.

In addition, it is known to provide a method, which prepares a plurality of low pass filters, determines as to whether or not edges are present in an image, and selectively applies a filter not to cause the edges to be faint, based on a determination result.

Next, the method of adding noises (the noise method) will be described.

For example, it is known to provide a method, which adds noises to DCT coefficients so as to make the coding distortion faint, when it is determined that distortion is noticeable in a region.

In this method, the coding distortion is considered to be noticeable when the region is determined to be a flat image region.

When a decoded image is generated from an encoded image (i.e., a decoding process is performed), it is a goal to approach the decoded image as close as possible to an original image before the original image is subject to an encoding process.

From this point of view, the methods according to prior art do not provide an optimal solution since faintness of the image by the low pass filter or addition of the noises does not approach the decoded image to the original image.

More specifically, these methods may have some side effects as follows.

(1) In the filtering method, signals in a high-frequency band of the decoded image are suppressed. Accordingly, when textures of high frequency components are present in the original image, it is impossible to reproduce these textures.

(2) In the filtering method, there may be a possibility of dullness of the edge due to a possibility of incorrect edge determination.

(3) In the noise method, there may be a possibility of textures occurring, which are not present in the original image, due to the addition of noises.

SUMMARY OF THE INVENTION

According to one aspect of the invention, a decoding apparatus includes a random-number generating section and a decoding section. The random-number generating section generates random numbers according to distribution of original data corresponding to respective quantization indexes. The decoding section generates decoded data on a basis of the random numbers generated by the random-number generating section.

According to another aspect of the invention, a decoding apparatus includes a standard-deviation acquiring section, a multiplying section, an upper-limit-value acquiring section, and a random-number generating section. The standard-deviation acquiring section acquires a standard deviation of transform coefficients corresponding to quantization indexes. The multiplying section multiplies the standard deviation acquired by the standard-deviation acquiring section by a preset value. The upper-limit-value acquiring section acquires an upper limit value of generated random numbers. The random-number generating section uniformly generates the random numbers, with smaller one of the standard deviation multiplied by the preset value by the multiplying section and the upper limit value acquired by the upper-limit-value acquiring section being an upper limit.

According to another aspect of the invention, a decoding apparatus includes a frequency measuring section, a histogram normalizing section, an addition range determining section, and a distribution determining section. The frequency measuring section measures appearance frequency of quantization indexes. The histogram normalizing section generates normalized histograms based on the appearance frequency measured by the frequency measuring section. The addition range determining section determines an addition range in which frequency distribution of the quantization indexes is added. The distribution determining section determines at least one of a standard deviation and a variance based on the histograms generated by the histogram normalizing section and the addition range determined by the addition range determining section.

According to another aspect of the invention, a decoding apparatus includes a first calculating section, a second calculating section, and a distribution estimating section. The first calculating section calculates at least one of a standard deviation of quantization indexes and a variance of the quantization indexes. The second calculating section calculates at least one of a standard deviation of a Laplace distribution and a variance of the Laplace distribution so that a sum of values of frequency of the quantization indexes within a preset range is equal to an integral value of a Laplace distribution function corresponding to the preset range. The distribution estimating section estimates distribution of original data corresponding to the quantization indexes using at least one of (A) the at least one of the standard deviation and the variance calculated by the first calculating section and (B) the at least one of the standard deviation and the variance calculated by the second calculating section.

According to another aspect of the invention, a dequantizing method includes generating random numbers according to distribution of original data corresponding to respective quantization indexes; and generating dequantization values based on the generated random numbers.

According to another aspect of the invention, a distribution determining method includes adding values of frequency of the respective quantization indexes; and calculating at least one of a variance of a Laplace distribution and a standard deviation of the Laplace distribution so that a resultant value of the addition of values of frequency is equal to an integral value when a Laplace distribution function is integrated so that an integral range of a right side is equal to an integral range of a left side with using a maximum frequency position of the Laplace distribution as a reference.

According to another aspect of the invention, a storage medium, which is readable by a computer, stores a program of instructions executable by the computer to perform a dequantization function comprising the steps of generating random numbers according to distribution of original data corresponding to respective quantization indexes; and generating dequantization values based on the generated random numbers.

According to another aspect of the invention, a storage medium, which is readable by a computer, stores a program of instructions executable by the computer to perform a dequantization function comprising the steps of adding values of frequency of the respective quantization indexes; and calculating at least one of a variance of a Laplace distribution and a standard deviation of the Laplace distribution so that a resultant value of the addition of values of frequency is equal to an integral value when a Laplace distribution function is integrated so that an integral range of a right side is equal to an integral range of a left side with using a maximum frequency position of the Laplace distribution as a reference.

BRIEF DESCRIPTION OF THE DRAWINGS

Embodiment of the invention will be described in detail based on the following figures, wherein:

FIG. 1A is a block diagram schematically illustrating an encoding process of a transform coding method such as JPEG and JPEG2000;

FIG. 1B is a block diagram schematically illustrating a decoding process of a transform coding method such as JPEG and JPEG2000;

FIG. 8A is a schematic diagram illustrating correction by a correcting section 580;

FIG. 8B is a schematic diagram illustrating correction by a correcting section 580;

FIG. 10 is a diagram illustrating an exemplary filter used by a dequantization-value estimating section 500.

FIG. 12 is a diagram illustrating transform coefficients in the JPEG2000;

DETAILED DESCRIPTION OF THE EMBODIMENTS OF THE INVENTION

Hereinafter, a first embodiment of the invention will be described.

In this embodiment, a case where code data encoded according to the JPEG is decoded will be described by way of examples. A decoding process to be described in this embodiment is approximately similar to that described in ITU-T Recommendation T.81. However, the decoding process of this embodiment is different in a dequantization process from that of ITU-T Recommendation T.81.

[Hardware Configuration]

First, a hardware configuration of the decoding apparatus 2 according to this embodiment will be described.

Figure 2A:
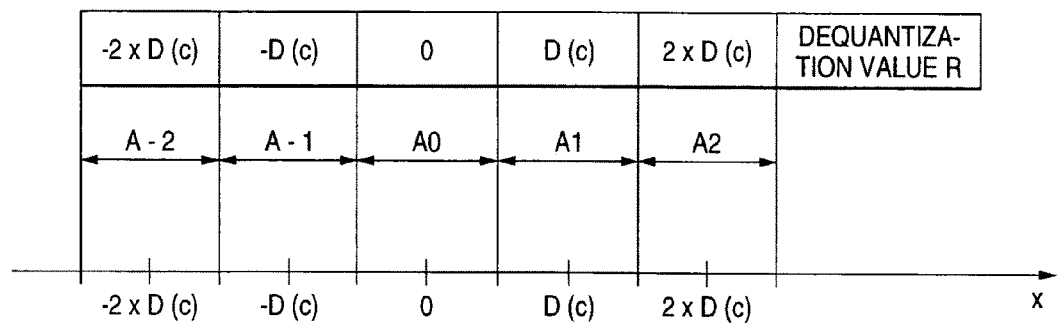
FIG. 2A is a diagram illustrating a quantization process in the transform coding method.
Figure 2B:
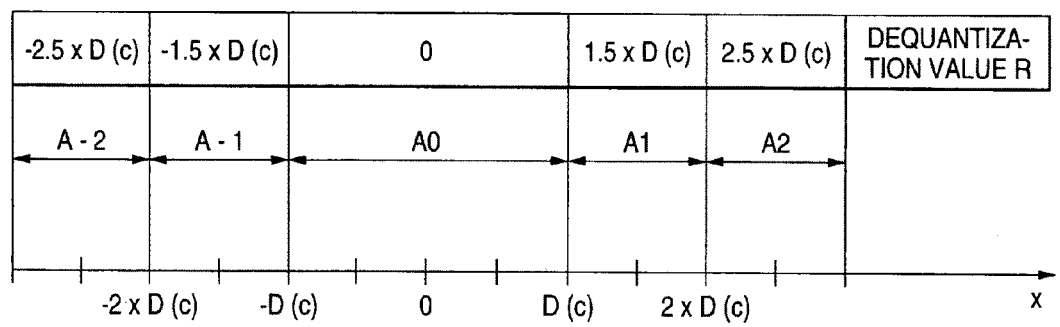
FIG. 2B is a diagram illustrating a quantization process in the transform coding method.
Figure 2C:
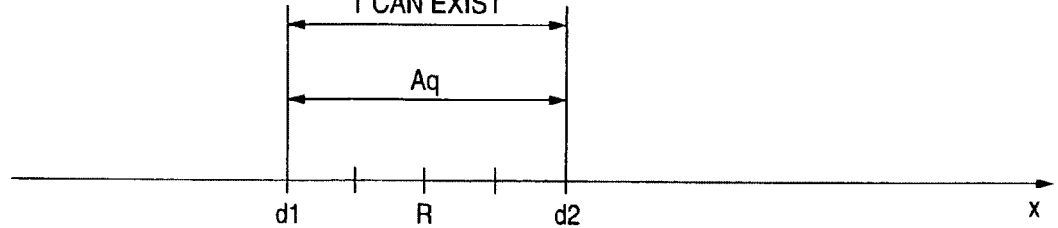
FIG. 2C is a diagram illustrating a quantization process in the transform coding method.
Figure 3:
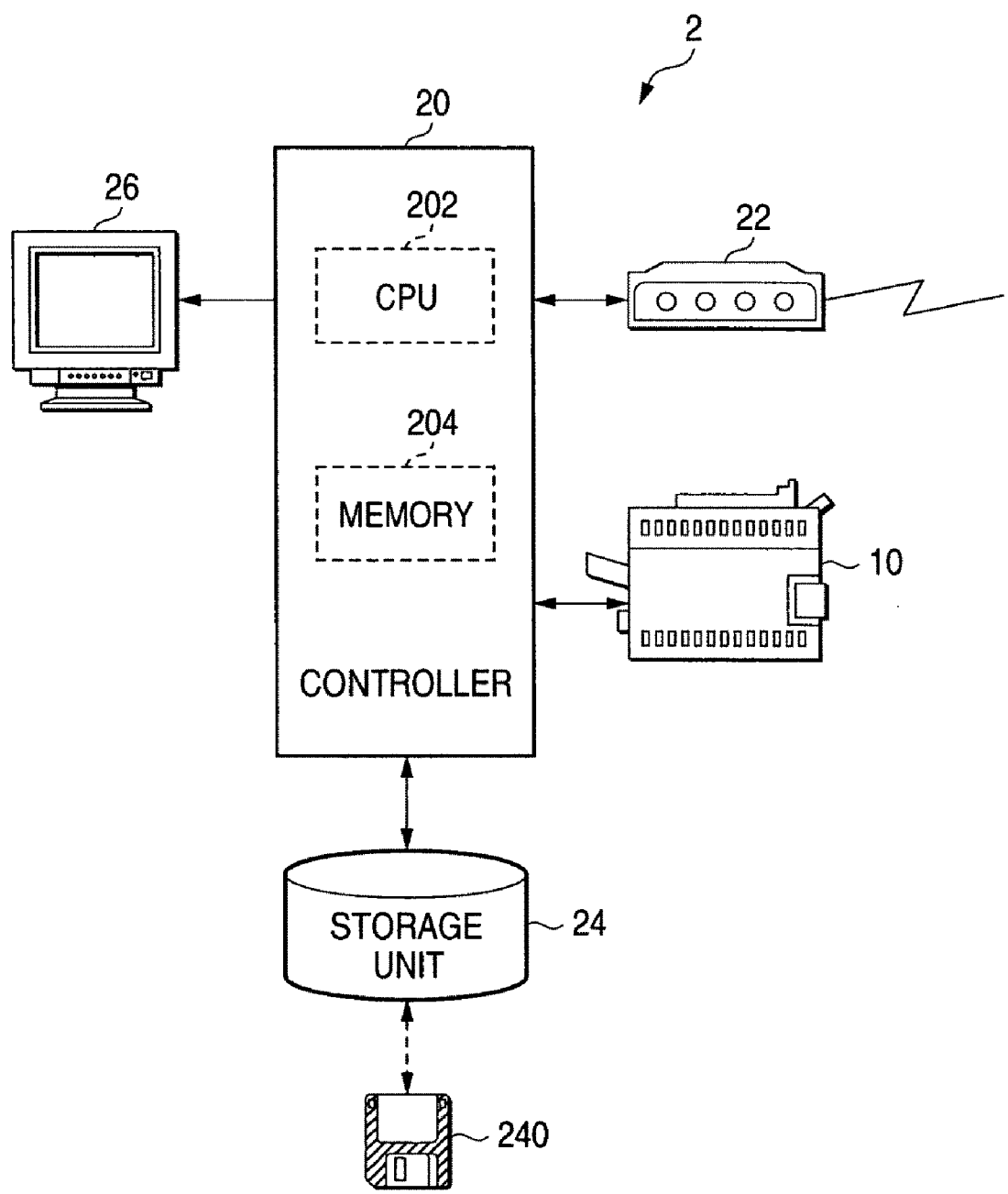
FIG. 3 is a diagram illustrating a hardware configuration of a decoding apparatus 2 to which a decoding method according to embodiments of the invention is applied, with providing a controller 20 centrally.

FIG. 3 is a diagram illustrating a hardware configuration of the decoding apparatus 2 to which a decoding method according to the invention is applied, with a controller 20 as the central figure.

As shown in FIG. 3, the decoding apparatus 2 includes a controller 20 including CPU 202, a memory 204 and the like, a communication unit 22, a storage unit 24 such as HDD, CD and the like, and a user interface unit (UI unit) 26 including an LCD display device or a CRT display device, a key board, a touch panel and the like.

The decoding apparatus 2 is a general-purpose computer in which a decoding program 5, which will be described later, is installed. The decoding apparatus 2 acquires code data through the communication unit 22, the storage unit 24 or the like and decodes the acquired code data.

[Decoding Program]

Figure 4:
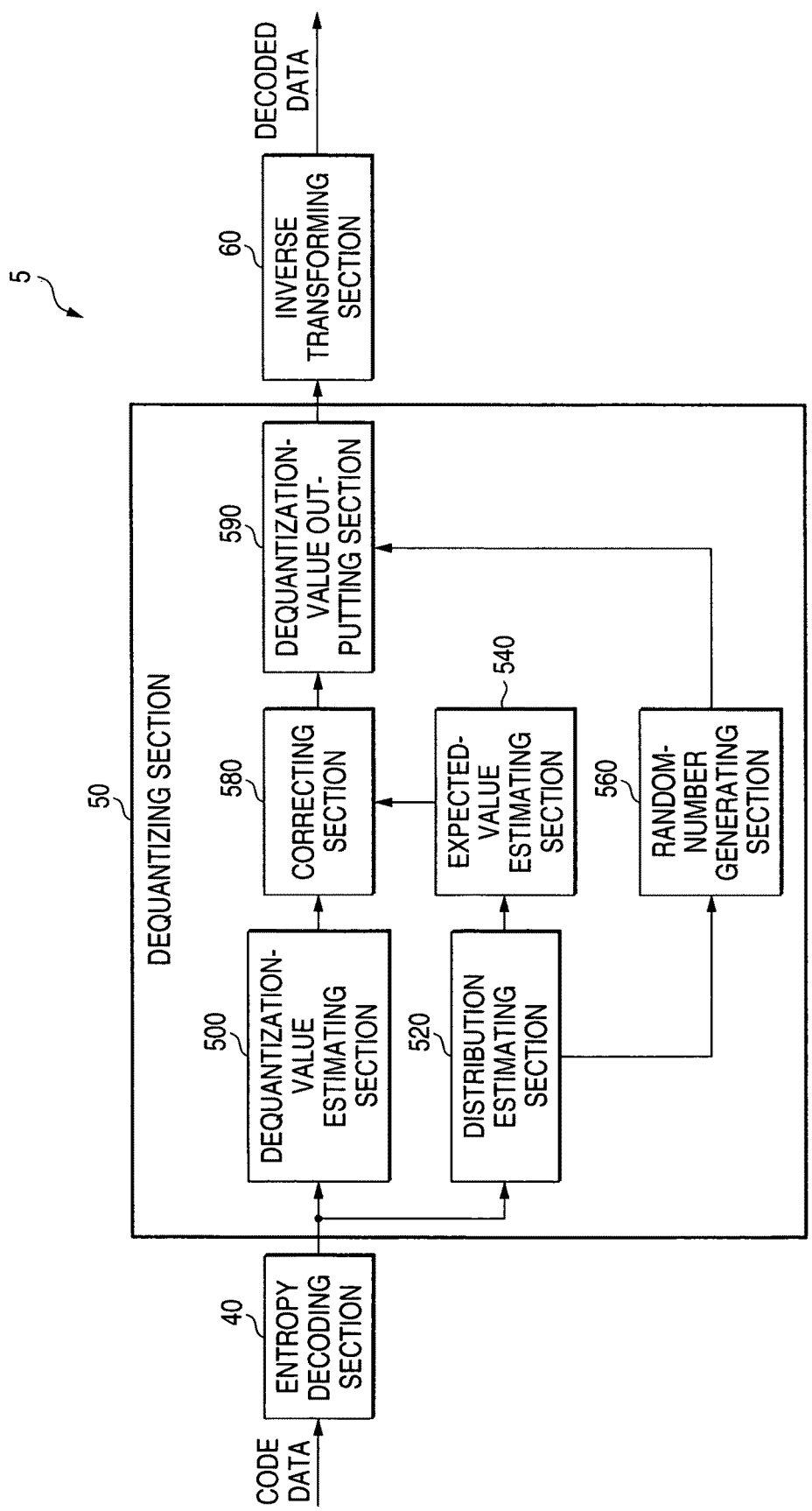
FIG. 4 is a diagram illustrating a functional configuration of a decoding program 5 executed by the controller 20 shown in FIG. 3, for implementing a decoding method according to the embodiments of the invention.

FIG. 4 is a diagram illustrating a functional configuration of the decoding program 5 executed by the controller 20 shown in FIG. 3, for implementing a decoding method according to embodiments of the invention.

As shown in FIG. 4, the decoding program 5 includes an entropy decoding section 40, a dequantizing section 50 and an inverse transforming section 60.

Also, the dequantizing section 50 includes a dequantization-value estimating section 500, a distribution estimating section 520, an expected-value estimating section 540, a random-number generating section 560, a correcting section 580, and a dequantization-value outputting section 590.

In the decoding program 5, the entropy decoding section 40 entropy-decodes input code data and outputs the decoded data to the dequantizing section 50.

The entropy decoding section 40 of this embodiment decodes the input code data to generate a quantization index Q and outputs the generated quantization index Q to the dequantizing section 50.

The dequantizing section 50 generates a dequantization value R based on the quantization index Q input from the entropy decoding section 40 and outputs the generated dequantization value R to the inverse transforming section 60.

The inverse transforming section 60 performs an inverse transform based on the dequantization value R input from the dequantizing section 50 to generate a decoded image.

In the dequantizing section 50, the dequantization-value estimating section 500 estimates a dequantization value based on the quantization index Q input from the entropy decoding section 40, and outputs the estimated dequantization value to the correcting section 580. That is, the dequantization-value estimating section 500 does not always generate a single dequantization value for one quantization index value, but can generate a plurality of different dequantization values for one quantization index value. In other words, although the dequantization-value estimating section 500 generates one dequantization value for each quantization index, the dequantization-value estimating section 500 does not necessarily generate the same dequantization value even when input quantization indexes have the same value.

The dequantization-value estimating section 500 of this embodiment calculates a correction factor $\alpha$ of the dequantization value R corresponding to the quantization index of a given block, based on the quantization index of the given block and the quantization index (limited to one having a quantization index of the same kind c as the transform coefficient) of another block adjacent to the given block, and outputs the calculated correction factor $\alpha$ to the correcting unit 580.

Further, in the following description, a correction factor $\alpha$ corresponding to each transform coefficient kind c and each quantization index q is denoted by $\alpha ycq$. In addition, assuming that the number of signals each having the transform coefficient kind c and the quantization index q is K, and that each correction factor is denoted by $\alpha ycq(k)$ (where, $k=1, 2, \ldots, K$).

The distribution estimating section 520 estimates distribution of transform coefficients (of original data) based on a plurality of quantization indexes (or, dequantization values corresponding to the plurality of quantization indexes) input from the entropy decoding section 40, and then outputs distribution data representing the estimated distribution of transform coefficients to the expected-value estimating section 540 and the random-number generating section 560.

The distribution estimating section 520 in this example calculates the frequency distribution of quantization indexes for each transform coefficient kind c, and then generates the distribution data for each transform coefficient kind c based on the calculated frequency distribution.

The expected-value estimating section 540 calculates expected values of the dequantization values based on the distribution data input from the distribution estimating section 520, and then outputs the calculated expected values and the distribution data to the correcting section 580.

More specifically, the expected-value estimating section 540 calculates expected values for each quantization interval (that is, expected values for each quantization index value) based on the distribution data generated for each transform coefficient kind c.

When the transform coefficient kind is c and the quantization index Q(c, i, j) is equal to q, an expected value is indicated by $E(\alpha Tcq)$. That is, the expected value $E(\alpha Tcq)$ indicates estimated expected values of differences between the dequantization values R corresponding to the quantization indexes in a one-to-one manner and the original transform coefficients T corresponding to the quantization indexes.

The random-number generating section 560 generates random numbers according to the distribution data input from the distribution estimating section 520, and outputs the generated random numbers to the dequantization-value outputting section 590.

The correcting section 580 corrects the dequantization value (the correction factor $\alpha$ of the dequantization value in this example) input from the dequantization-value estimating section 500 based on the distribution data or the expected values input from the expected-value estimating section 540.

Further, the correcting section 580 corrects the dequantization value (the correction factor $\alpha$ of the dequantization value in this example) input from the dequantization-value estimating section 500 to be in a preset range (for example, in the case of the dequantization value, a quantization interval corresponding to the quantization index), and then outputs the corrected dequantization value (the correction factor α) to the dequantization-value outputting section 590.

The correcting section 580 in this example corrects the correction factor α input from the dequantization-value estimating section 500 based on the expected value input from the expected-value estimating section 540 such that the frequency distribution of quantization indexes calculated by the distribution estimating section 520 becomes approximately identical with the frequency distribution of dequantization values calculated by the dequantization-value estimating section 500 for each transform coefficient kind c and each quantization interval, and then linearly corrects the corrected correction factor α again to fall within a range of −0.5 to 0.5 in the JPEG.

The linear correction executed by the correcting section 580 is, for example, achieved by selecting the maximum value αmax and the minimum value αmin from among the correction factors α corresponding to the same quantization index and then by linearly transforming all the correction factors α such that the selected maximum value αmax and minimum value αmin fall within the preset range (the range of −0.5 to 0.5 in the JPEG).

Furthermore, the correcting section 580 may take the correction factors α as a boundary value of this range (i.e., one of −0.5 and 0.5, which is closer to α) if the correction factors α is outside the range of −0.5 to 0.5. Also, the correcting section 580 may take the correction factors α as 0 if the correction factors α is outside the range of −0.5 to 0.5.

In addition, the JPEG2000 is different from the JPEG only in the range of the correction factors α. That is, in the JPEG2000, the correcting section 580 corrects the correction factors α on the basis of a range of $0 \leq r+\alpha \leq 1$ if $Q(c, i, j)>0$, a range of $-1 \leq r+\alpha \leq 0$ if $Q(c, i, j)<0$, and a range of $-1 \leq \alpha \leq 1$ if $Q(c, i, j)=0$, respectively.

The dequantization-value outputting section 590 determines a dequantization value to be applied by using the dequantization value (the correction factors α of the dequantization value in this example) input from the correcting section 580 or the random numbers input from the random-number generating section 560, and then outputs the determined dequantization value to the inverse transforming section 60.

The dequantization-value outputting section 590 in this example calculates the dequantization value based on the correction factors α input from the correcting section 580 or the random-number generating section 560 and the quantization index (or the dequantization value associated with the quantization index). More specifically, the dequantization-value outputting section 590 calculates the dequantization value $Ry(c, i, j)$ to be applied, using the following equation.

$$Ry(c,i,j)=\{Q(c,i,j)+\alpha(c,i,j)\} \times D(c)$$

That is, the decoding program 5 of this embodiment does not apply the random numbers generated by the random-number generating section 560 as the dequantization values themselves, but applies the random numbers generated by the random-number generating section 560 as the correction factors α of the dequantization values.

[Distribution Estimating Section]

Figure 5:
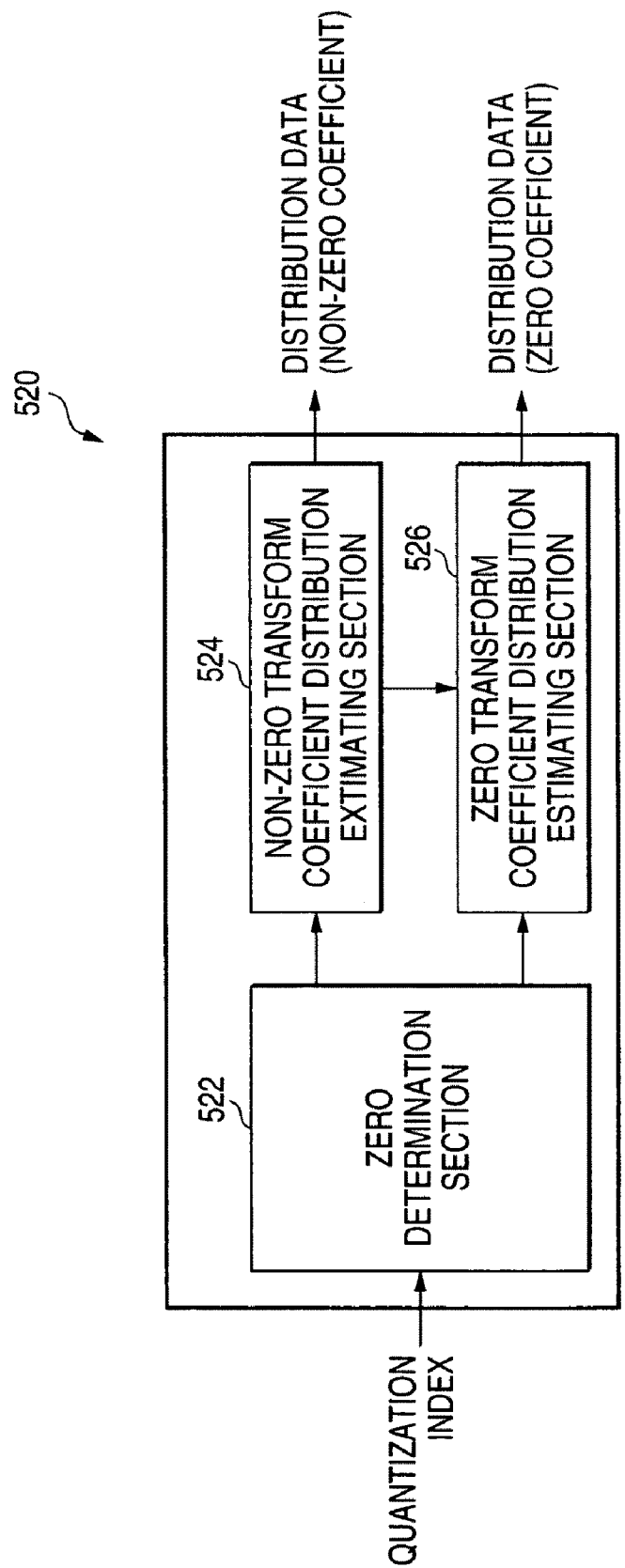
FIG. 5 is a diagram illustrating a distribution estimating section 520 (FIG. 4) in more detail.

FIG. 5 is a diagram illustrating a distribution estimating section 520 of FIG. 4 in more detail.

As shown in FIG. 5, the distribution estimating section 520 includes a zero determining section 522, a non-zero transform coefficient distribution estimating section 524, and a zero transform coefficient distribution estimating section 526.

In the distribution estimating section 520, the zero determining section 522 classifies the quantization indexes input from the entropy decoding section 40 according to an attribute (for example, the kind of transform coefficients) of original data corresponding to the quantization indexes, and determines as to whether or not the frequency distribution of the original data can be estimated only by groups of quantization indexes classified according to attributes of the original data (in other words, whether or not the frequency distribution can be estimated using correlation between a group of quantization indexes classified according to an attribute of the original data and another group of quantization indexes classified according to a different attribute of the original data).

The zero determining section 522 in this example determines as to whether the quantization indexes input from the entropy decoding section 40 correspond to zero transform coefficients or non-zero transform coefficients, outputs the quantization indexes determined to correspond to the non-zero transform coefficients to the non-zero transform coefficient distribution estimating section 524, and instructs the zero transform coefficient distribution estimating section 526 to apply a distribution estimation process to the quantization indexes determined to correspond to the zero transform coefficients, using distribution of the non-zero transform coefficients.

Here, the non-zero transform coefficients refer to transform coefficients in which any of the quantization indexes of one transform coefficient kind c is not zero. In addition, the zero transform coefficients refer to transform coefficients in which all of the quantization indexes of one transform coefficient kind c are zero. In other words, all transform coefficients other than the zero transform coefficients are the non-zero transform coefficients.

The non-zero transform coefficient distribution estimating section 524 estimates the frequency distribution (transform coefficients in this example) of the original data based on the quantization indexes input from the zero determining section 522.

More specifically, the non-zero transform coefficient distribution estimating section 524 generates the frequency distribution of the groups of quantization indexes having the same attribute (in this example, a plurality of quantization indexes corresponding to the same transform coefficient kind c), and prepares a probability density function of quantization indexes based on the generated frequency distribution of quantization indexes. This probability density function is applied as an approximation to a probability density function of transform coefficients.

The non-zero transform coefficient distribution estimating section 524 in this example prepares a histogram hc(q) of the quantization indexes $Q(c, i, j)$ input from the zero determining section 522 (the quantization indexes corresponding to the non-zero transform coefficients) for each transform coefficient kind c.

For example, the non-zero transform coefficient distribution estimating section 524 defines a function ht (c, q, i, j) so that ht (c, q, i, j)=1 if values of the quantization indexes $Q(c, i, j)$ are q and otherwise, ht(c, q, i, j)=0, and prepares the histogram hc(q) based on such definition.

$$hc(q) = \sum_i \sum_j ht(c, q, i, j) \qquad (1)$$

Next, the non-zero transform coefficient distribution estimating section 524 in this example approximates the prepared histogram hc(q) by the Laplace distribution, taking this Laplace function as a distribution function of transform coefficients T.

An equation of the Laplace distribution can be expressed as follows:

$$L(x) = \frac{1}{\sqrt{2}\,\sigma} \exp\left(\frac{-\sqrt{2}\,|x|}{\sigma}\right) \quad (2)$$

The non-zero transform coefficient distribution estimating section 524 can obtain the distribution function of transform coefficients T by calculating σ in Equation (2).

First, the non-zero transform coefficient distribution estimating section 524 normalizes the prepared histogram hc(q) with the width D(c) of a quantization interval and the total number of quantization indexes, and transforms the normalized histogram hc(q) into a probability density function fhc(x). Specifically, the non-zero transform coefficient distribution estimating section 524 transforms the histogram hc(q) into the probability density function fhc(x) according to the following equation.

$$fhc(x) = \frac{hc(q)}{D(c) \times \sum_q hc(q)} \quad (3)$$

Here, $(q-0.5) \times D(c) < x \leq (q+0.5) \times D(c)$

Next, the non-zero transform coefficient distribution estimating section 524 calculates the Laplace function approximating the histogram hc(q).

Figure 6:
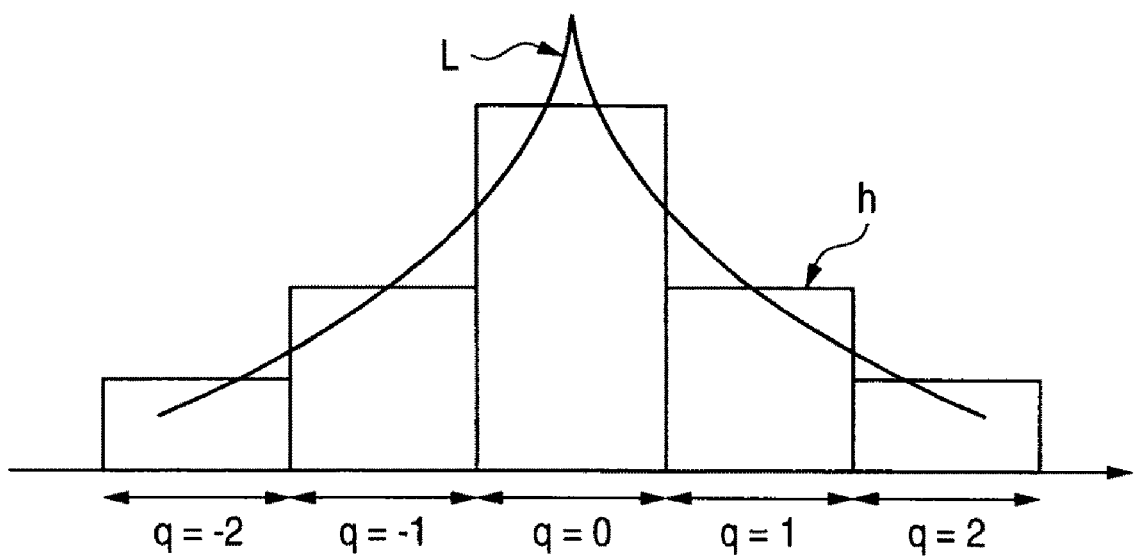
FIG. 6 is a diagram illustrating an exemplary histogram h and an exemplary distribution function L (Laplace function)

FIG. 6 is a diagram illustrating a histogram h and a distribution function L (Laplace function).

As shown in FIG. 6, the non-zero transform coefficient distribution estimating section 524 may find a to make a difference (an area difference in this example) between the Laplace function L(x) and the histogram fhc(x) as small as possible.

The following error function Err(σ) is defined as a function to estimate 'making the difference as small as possible'.

$$\mathrm{Err}(\sigma) = \sum_q \left| \int_{(q-0.5) \times D(c)}^{(q+0.5) \times D(c)} \{L(x) - fhc(x)\} dx \right| \quad (4)$$

This error function Err(σ) is a function of summing absolute vales of differences of areas of the probability density functions obtained for the quantization index values q. As values of the error function Err(σ) become small, it can be said that the histogram fhc(x) approaches the Laplace function L(x). The non-zero transform coefficient distribution estimating section 524 obtains σ to minimize the error function Err(σ) through a numerical calculation.

The zero transform coefficient distribution estimating section 526 estimates frequency distribution of zero transform coefficients based on the frequency distribution of other transform coefficients estimated by the non-zero transform coefficient distribution estimating section 524 according to instructions from the zero determining section 522.

That is, the zero transform coefficient distribution estimating section 526 can estimate the frequency distribution only if the histogram has a meaningful shape, but cannot estimate the shape of the frequency distribution when the histogram in which all values of frequency are zero is prepared.

For that reason, the zero transform coefficient distribution estimating section 526 estimates the shape of the Laplace distribution in which all quantization indexes of the transform coefficient kind c are zero, using another obtained distribution data (σ in this example), according to a method to be described below.

In this example, since the decoding process in the JPEG is described by way of example, transform coefficient kinds are arranged in a two-dimensional 8×8 matrix.

Figure 7A:
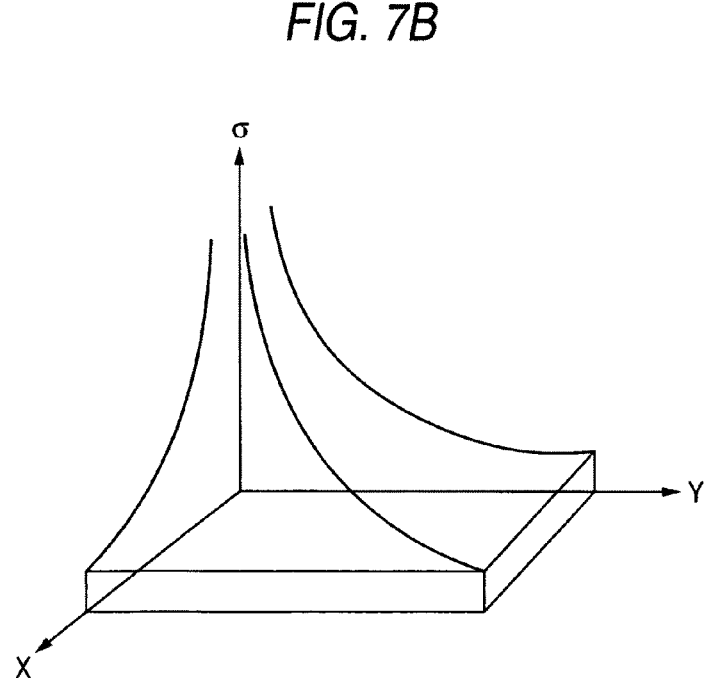
FIG. 7A is a diagram illustrating a distribution estimating process performed by a zero transform coefficient distribution estimating section 526.

Here, values of σ are arranged in a two-dimension, corresponding to (1, 1) to (8, 8) components of DCT coefficients, as shown in FIG. 7A. That is, values of σ corresponding to transform coefficients having (x, y) components are represented by σ(x, y).

For example, σ(1, 1) is a value of σ having a DC component and σ(8, 8) is a value of σ of a transform coefficient representing the highest AC component. In this example, however, since the non-zero transform coefficient distribution estimating section 524 and the zero transform coefficient distribution estimating section 526 cannot approximate the value of σ corresponding to the DC component by the Laplace distribution, this value of σ is not used for the estimation of values of σ.

In this example, it is assumed that σ(x, y) is a function on an x-y plane. The zero transform coefficient distribution estimating section 526 determines this function σ(x, y) using the values of σ already obtained (that is, the values of σ calculated by the non-zero transform coefficient distribution estimating section 524) and estimates the values of σ corresponding to the zero transform coefficients.

Specifically, the zero transform coefficient distribution estimating section 526 approximates the function σ(x, y) by a two-dimensional exponential function. That is, σ(x, y)=Cexp(−ax−by).

Figure 7B:
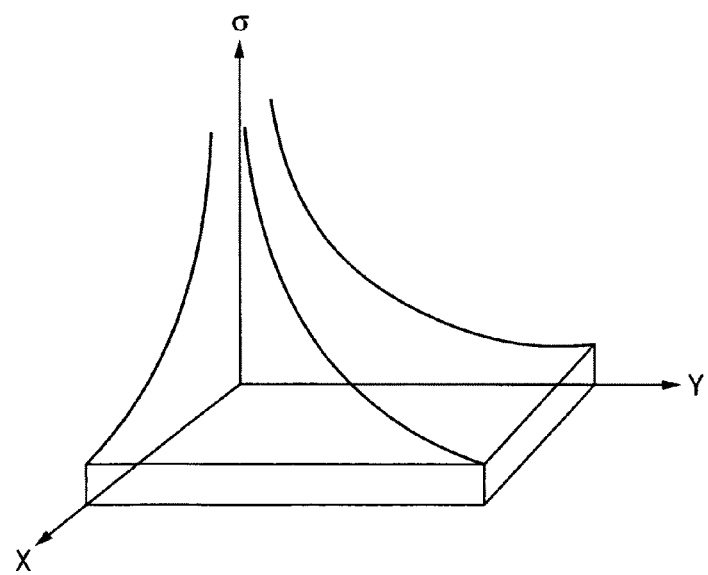
FIG. 7B is a diagram illustrating a distribution estimating process performed by a zero transform coefficient distribution estimating section 526.

This corresponds to that the zero transform coefficient distribution estimating section 526 approximates the values of a by the exponential function, as shown in FIG. 7(B).

The zero transform coefficient distribution estimating section 526 calculates parameters C, a and b in the equation of σ(x, y)=Cexp(−ax−by) to determine the approximation function σ(x, y), and calculates the values of σ corresponding to the zero transform coefficients using the determined approximation function σ(x, y).

Here, σ(x, y) already obtained is set as σ(x(u), y(u)). Here, (x(u), y(u)), where u=1, 2, . . . , U, is a coordinate of the already obtained σ.

In addition, since all quantization indexes are zero, values of σ which could not be obtained are set as σ(x(v), y(v)). Here, v=1, 2, . . . , V, and U+V=63.

First, the zero transform coefficient distribution estimating section 526 determines C, a and b using σ(x(u), y(u)) (u=1, 2, . . . , U).

As a preparation for this, both sides of the equation of σ(x, y)=Cexp(−ax−by) are changed into a logarithmical form as follows:

$$\log \sigma(x,y) = \log C - ax - by$$

Next, σ(x(u), y(u)) is substituted into the logarithmical equation. That is, $$\log \sigma(x(u), y(u)) = \log C - ax(u) - by(u)$$

Here, since u=1, 2, . . . , U, the above equation is a calculation of a matrix as follows:

$$\begin{pmatrix} -x(1) & -y(1) & 1 \\ -x(2) & -y(2) & 1 \\ \cdots & \cdots & \cdots \\ -x(U) & -y(U) & 1 \end{pmatrix} \begin{pmatrix} a \\ b \\ \log C \end{pmatrix} = \begin{pmatrix} \log\sigma(x(1), y(1)) \\ \log\sigma(x(2), y(2)) \\ \cdots \\ \log\sigma(x(U), y(U)) \end{pmatrix} \quad (5)$$

Further, the above matrix can be solved as typical simultaneous equations if U=3. Also, the above matrix can be solved using the least square method if U>3.

In this manner, the zero transform coefficient distribution estimating section 526 can obtain the parameters a, b and C by solving the matrix.

Next, the zero transform coefficient distribution estimating section 526 calculates values of σ corresponding to the zero transform coefficients by substituting x(v) and y(v) corresponding to the zero transform coefficients into the equation of σ(x(v), y(v))=Cexp(-ax(v)-by(v)).

Furthermore, the zero transform coefficient distribution estimating section 526 may correct σ(x, y) to monotonously decrease with respect to x and y in order to obtain more pertinent estimation values of σ. That is, when σ(x(v), y(v)) is obtained with assuming that the equation of σ(x(v), y(v))=Cexp(-ax(v)-by(v)), σ(x(v), y(v)) is made smaller than or equal to σ(x, y) whose coordinate (x, y) is less than that of σ(x(v), y(v)). Specifically, the zero transform coefficient distribution estimating section 526 makes an correction using the following equation.

$$\sigma(x(v),y(v))=\min\{\sigma(x(v)-1,y(v)),\sigma(x(v),y(v)-1),\sigma(x(v)-1,y(v)-1)\}$$

[Details of Random-Number Generating Section]

Next, the random-number generating section 560 (FIG. 4) will be described in more detail.

The random-number generating section 560 applies a variable transformation, according to the quantization indexes Q(c, i, j) to be processed, to the distribution function fc(x) input from the distribution estimating section 520 (that is, the function corresponding to the values of σ (distribution data) calculated by the non-zero transform coefficient distribution estimating section 524 or the zero transform coefficient distribution estimating section 526).

Specifically, assuming that the quantization indexes Q(c, i, j)=q and a range of transform coefficients T(c, i, j) in which the quantization indexes Q(c, i, j)=q is d1 to d2, the random-number generating section 560 generates the following function fcq(x).

$$fcq(x) = \begin{cases} \dfrac{fc\left(\dfrac{d2-d1}{\alpha max - \alpha min}(x-\alpha min)-d1\right)}{\int_{d1}^{d2} fc(t)dt} & \alpha min \leq x < \alpha max \\ 0 & \text{otherwise} \end{cases} \quad (6)$$

This function fcq(x) is a probability density function corresponding to the transform coefficient kind c and the transform coefficients of the quantization indexes q. In addition, this probability density function is obtained by transforming the range of d1 to d2 into a range of αmin to αmax. A method of determining αmin and αmax may be considered in various ways as follows; for example, (1) a method of setting αmin and αmax as preset constant values when αmin=-αmax, (2) a method of using a preset constant value β and setting a value of (αmax-αmin) to be a quantization step size×β=αmax-αmin when αmin=-αmax, (3) a method of setting a upper limit value Dmax such that a value of the quantization step size×β is not larger than the preset constant value and determining αmin and αmax with αmax-αmin=min{the quantization step size×β, Dmax}, in addition to the above method (2), and (4) a method of setting a value of (αmin+αmax)/2 to be expected values of α (E(αTcq)) in modifications to be described).

The random-number generating section 560 generates random numbers α, which match the probability density function fcq(x).

The random numbers α are used as correction factors cc for calculation of the dequantization values by the dequantization-value outputting section 590 (FIG. 4).

Further, although the random numbers α are first generated and then the dequantization values R are obtained in this example, R may be directly generated as the random numbers. That is, the random-number generating section 560 may generate the random numbers to match the following probability density function fcq(x) and the dequantization-value outputting section 590 may output the random numbers as the dequantization values to the inverse transforming section 60.

$$fcq(x) = \begin{cases} \dfrac{fc(x)}{\int_{d1}^{d2} fc\,dt} & d1 \leq x < d2 \\ 0 & \text{otherwise} \end{cases} \quad (7)$$

Next, a method of generating the random numbers to match the probability density function fcq(x) will be described. As such a random number generating method, for example, an inverse function method, which is disclosed in 'Knowledge of random number' (Wakimoto Kazumasa, Morikita Shuppan Co., Ltd., pp. 61-64), may be applied.

Now, an example for this will described.

First, the following function Fcq(x) is obtained.

$$Fcq(x) = \int_{\alpha min}^{x} fcq(t)dt \quad (8)$$

Next, an inverse function $F^{-1}cq(x)$ of Fcq(x) is obtained. Subsequently, random numbers X in an interval [0, 1] are generated from a uniform random generator.

Finally, when $\alpha=F^{-1}cq(x)$, the random numbers a to match fcq(x) can be generated. Where, $F^{-1}cq(x)$ is the inverse function of Fcq(x).

In addition, if fc(x) has the Laplace distribution, the function $F^{-1}cq(x)$ may be fixed in a simple form in advance. Here, for the sake of simplicity, fcq(x) is normalized in advance. Further, αmin=-αmax. That is, fcq(x)=Cexp(-s|x|) (where, αmin≦x≦αmax).

When q>0, since x≦0, fcq(x)=Cexp(-sx).

Accordingly,

Fcq(x)=-(C/s) {exp(-sx)-exp(-sαmin)}

$F^{-1}cq(x)$=-(1/s) log {exp (-sαmin)-sx/C}

When q<0, since x<0, similarly, $F^{-1}cq(x)$=(1/s) log {exp(sαmin)+sx/C}

Moreover, when q=0 and x<0,
$F^{-1}cq(x)=(1/s) \log \{\exp(s\alpha min)+sx/C\}$
When q=0 and x≧0, $$Fcq(x) = \int_{\alpha min}^{0} C\exp(sx)da + \int_{0}^{x} C\exp(-st)dt = 0.5 - \frac{C}{s}\exp(-sx) + \frac{C}{s} \quad (9)$$

Accordingly, $F^{-1}cq(x)=-(1/s) \log \{1-s(x-0.5)/C\}$

In this manner, the random-number generating section 560 can generates the random numbers as the correction factors α appropriate for the distribution of transform coefficients, based on the distribution data input from the distribution estimating section 520.

[Correcting Section]

FIGS. 8A and 8B are schematic diagrams illustrating correction by the correcting section 580.

As shown in FIG. 8A, the correcting section 580 shifts (a3) the distribution of dequantization values to match an estimated expected value (a1) of the transform coefficients T to an expected value (a2) of the dequantization values.

Further, as shown in FIG. 8B, when the distribution of dequantization values (the correction factors α in this example) deviates from the quantization interval d1 to d2 (in this example, a case (b1) where the distribution of dequantization values deviates from the range of a (αmin to αmax)), the correcting section 580 makes the distribution small toward the expected value of the dequantization values (the correction factors α) without moving the expected value (b2).

Furthermore, in this example, the correcting section 580 makes the above-mentioned correction for the correction factors α input from the dequantization-value estimating section 500.

[Entire Operation]

Next, the entire operation of the decoding apparatus 2 (the decoding program 5) will be described.

Figure 9:
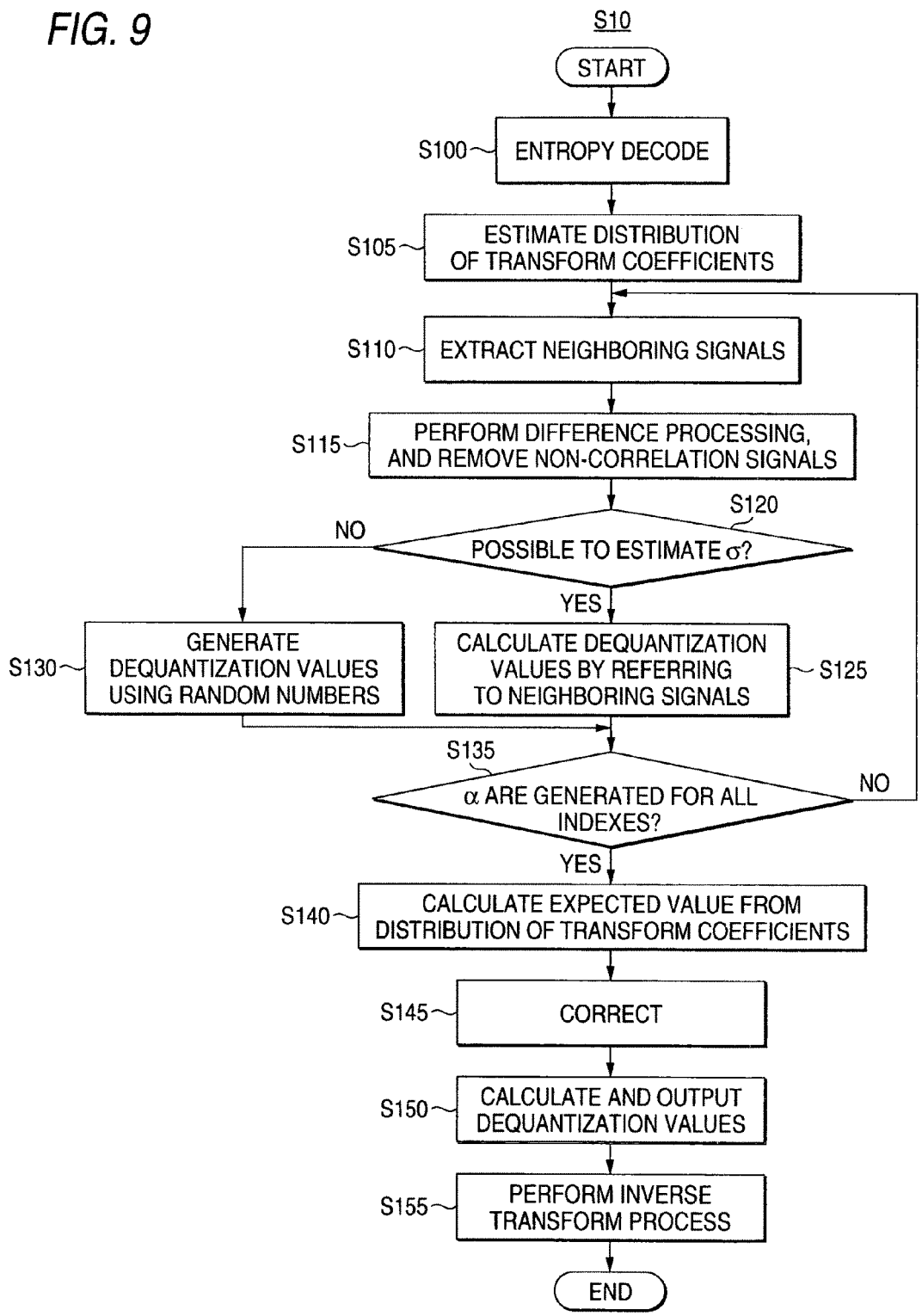
FIG. 9 is a flow chart of a decoding process S10 by the decoding program 5 (FIG. 4)

FIG. 9 is a flowchart of a decoding process S10 executed by the decoding program 5 (FIG. 4). In this example, a case where the code data (of the JPEG) of image data are input will be described by way of examples.

As shown in FIG. 9, in Step S100, the entropy decoding section 40 (FIG. 4) generates quantization indexes for each block (8×8 block) by decoding the input code data and outputs the generated quantization indexes for each block to the dequantizing section 50.

In Step S105, the distribution estimating section 520 estimates the distribution of transform coefficients T for each transform coefficient kind, based on the plurality of quantization indexes input from the entropy decoding section 40.

Specifically, when quantization indexes corresponding to an image of a single page are input from the entropy decoding section 40 to the zero determining section 522 (FIG. 5) provided in the distribution estimating section 520, the zero determining section 522 classifies the input quantization indexes into transform coefficient kinds and determines as to whether the classified quantization indexes correspond to the zero transform coefficients or the non-zero transform coefficients.

The non-zero transform coefficient distribution estimating section 524 (FIG. 5) prepares the histogram hc(q) of the quantization indexes (that is, the histogram for each transform coefficient kind c) for each group of quantization indexes corresponding to the non-zero transform coefficients and calculates the Laplace function L (that is, values of σ) approximating the histogram hc(q).

Further, the zero transform coefficient distribution estimating section 526 (FIG. 5) approximates the frequency distribution calculated by the non-zero transform coefficient distribution estimating section 524 by an exponential function and estimates the frequency distribution of zero transform coefficients (that is, values of σ) using this exponential function.

In Step S110, the dequantizing section 50 (FIG. 4) sets the input quantization indexes to a given quantization index in order.

The dequantization-value estimating section 500 (FIG. 4) extracts neighboring quantization indexes Q(c, i+m, j+n) (−1≦m≦1 and −1≦n≦1 in this example) around the given quantization index Q(c, i, j). The extracted neighboring quantization indexes are quantization indexes of the same transform coefficient kind c in 3×3 blocks around the given block and have a 3×3 matrix.

In Step S115, the dequantizing-value estimating section 500 prepares a difference matrix P by performing the following calculation using the extracted neighboring quantization indexes and the given quantization index.

$$P(m,n)=Q(c,i+m,j+n)-Q(c,i,j)$$

That is, the dequantizing-value estimating section 500 calculates a difference value between a value of the given quantization index and values of the neighboring quantization indexes.

Next, the dequantizing-value estimating section 500 compares an absolute value |P(m, n)| of each difference value included in the difference matrix P with a threshold TH (for example, 1), and sets a difference value P(m, n) larger than the threshold TH as 0 (threshold process). That is, if a difference between the neighboring quantization index value and the given quantization index value is larger than the threshold, the dequantizing-value estimating section 500 removes such a neighboring quantization index value as a non-correlation signal.

In Step S120, the dequantizing section 50 (FIG. 4) determines as to whether or not dequantization values can be estimated for the given quantization index.

Specifically, if the given quantization index and all components of the difference matrix P having been subjected to the threshold process are 0 (for example, if values in all neighboring quantization indexes (quantization indexes of neighboring blocks) are equal, or if all neighboring quantization indexes are removed as non-correlation signals, etc), the dequantizing section 50 determines that the estimation of dequantization values is impossible. Otherwise, the dequantizing section 50 determines that the estimation of dequantization values is possible.

If the dequantizing section 50 determines that the estimation of dequantization values (in this embodiment, estimation of the correction factors α) is possible, the process proceeds to Step S115. If the dequantizing section 50 determines that the estimation of dequantization values is impossible, the process proceeds to Step S120.

Figure 10:
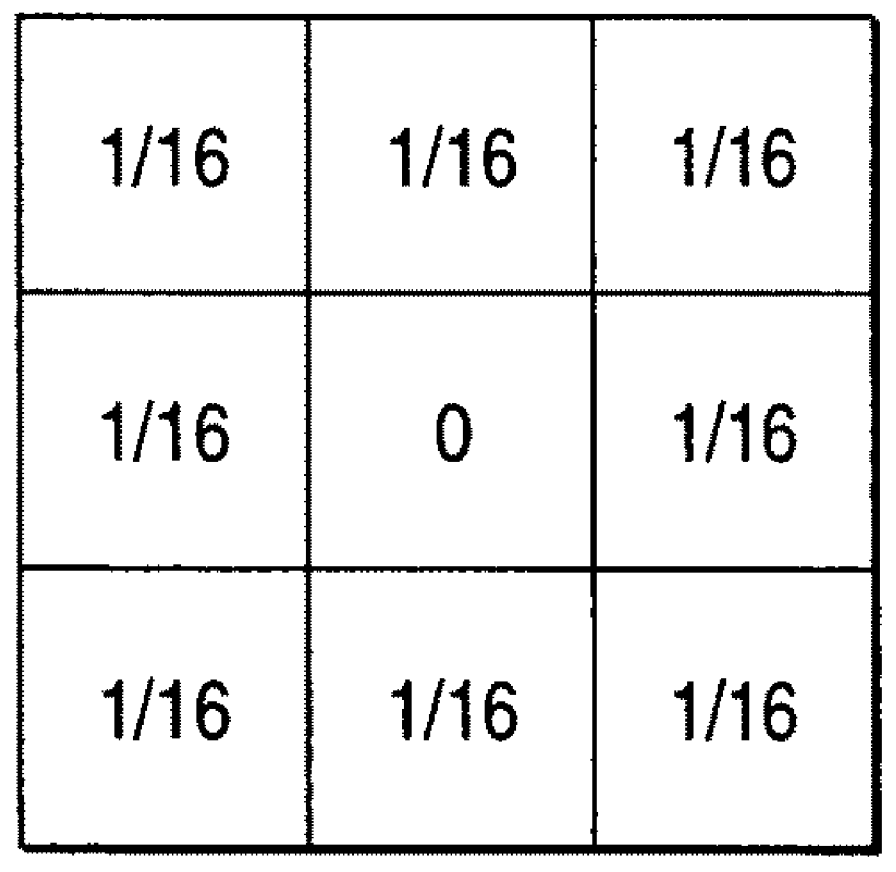

In Step S125, the dequantization-value estimating section 500 calculates correction factors αycq, using a 3×3 filter kernel K(m, n) shown in FIG. 10, by performing a convolution operation for the difference matrix P having been subjected to the threshold process. Accordingly, even when values of the given quantization indexes are equal, if neighboring quantization indexes around the given quantization indexes are different, the calculated correction factors αycq have different values.

In addition, a filter shown in FIG. 10 has a low pass characteristic.

In Step S130, the random-number generating section 560 generates random numbers according to the distribution data input from the distribution estimating section 520 for the given quantization index and outputs the generated random numbers to the dequantization-value outputting section 590 as the correction factors $\alpha$.

Specifically, the random-number generating section 560 selects a distribution corresponding to the given quantization index from among the distributions estimated by the non-zero transform coefficient distribution estimating section 524 and the zero transform coefficient distribution estimating section 526, generates random numbers to match the selected distribution, and outputs the generated random numbers to the dequantization-value outputting section 590 as the correction factors $\alpha$.

In Step S135, the dequantizing section 50 determines as to whether or not the correction factors $\alpha$ are generated for all quantization indexes. If it is determined that the correction factors $\alpha$ are generated for all quantization indexes, the process proceeds to Step S140. Otherwise, the process returns to Step S110 where a next quantization index is taken as a given quantization index to be processed.

In Step S140, the expected-value estimating section 540 calculates expected values $E(\alpha Tcq)$ of the probability density function for each combination of the transform coefficient kind and the quantization indexes based on the distribution data input from the distribution estimating section 520, and outputs the calculated expected values $E(\alpha Tcq)$ to the correcting section 580.

In Step S145, the correcting section 580 classifies the correction factors $\alpha$ calculated by the dequantization-value estimating section 500 for each transform coefficient kind and each quantization index, and calculates the minimum value, the maximum value and a mean value of the classified correction factors $\alpha$.

Next, the correcting section 580 compares the expected values $E(\alpha Tcq)$ input from the expected-value estimating section 540 with the calculated mean value for each combination of the transform coefficient kind and the quantization indexes, and shifts a group of correction factors $\alpha ycq$ classified into combinations of the transform coefficient kind and the quantization indexes such that the expected values $E(\alpha Tcq)$ become equal to the mean value (shift correction).

Further, the correcting section 580 determines as to whether or not the group of correction factors $\alpha$ having been subjected to the shift correction falls within a range of −0.5 to 0.5. If it is determined that the group of correction factors $\alpha$ does not fall within the range, a range correction to make the range of the group of correction factors $\alpha ycq$ fall within the range of −0.5 to 0.5 is performed without changing the mean value of the group of correction factors $\alpha ycq$.

In Step S150, the dequantization-value outputting section 590 (FIG. 4) calculates a dequantization value Ry to be applied, based on the given quantization index Q and the correction factors $\alpha$ input from the correcting section 580 or the correction factors $\alpha$ input from the random-number generating section 560, and outputs the calculated dequantization value Ry to the inverse transforming section 60.

Specifically, the dequantization-value outputting section 590 in this example calculates the dequantization value Ry by performing the following calculation.

$$Ry(c,i,j) = \{Q(c,i,j) + \alpha(c,i,j)\} \times D(c)$$

In Step S155, the inverse transforming section 60 (FIG. 4) performs an inverse transform (an inverse DCT in this example) using the dequantization value (approximate transform coefficient) input from the dequantizing section 50 to generate a decode image H.

As described above, the decoding apparatus 2 in this embodiment estimates the distribution of transform coefficients based on the quantization indexes, generates the random numbers to match the estimated distribution, and generates the dequantization values based on the generated random numbers.

Accordingly, since the frequency distribution of dequantization values becomes close to the frequency distribution of transform coefficients, a decoded image having higher reproducibility can be expected.

The configuration including the dequantization-value estimating section 500 for calculating the correction factors $\alpha$ using the neighboring quantization index values and the random-number generating section 560 for generating the random numbers, which matching the distribution of quantization indexes, as the correction factors $\alpha$ has been described in the above embodiment. However, the dequantization-value estimating section 500 is not essential. That is, the random-number generating section 560 may generate the correction factors $\alpha$ for all quantization indexes.

[First Modification]

Next, a first modification will be described.

Although the distribution of transform coefficients is estimated by the Laplace distribution in the above embodiment, a polygonal-line approximation may performed for the distribution of transform coefficients in the first modification, as shown in FIG. 11.

For example, assuming that $\alpha mid$ is defined as $\alpha min + \alpha max$, the non-zero transform coefficient distribution estimating section 524 (FIG. 5) makes an estimation by approximating the probability density function by a straight line (polygonal line) connecting $\alpha min$, $\alpha mid$, and $\alpha max$.

However, when the quantization index value q has an AC component and approaches 0, the linear approximation is difficult to be achieved. Therefore, the non-zero transform coefficient distribution estimating section 524 employs another approximation method. More specifically, the non-zero transform coefficient distribution estimating section 524 alternates between a plurality of approximation methods based on a threshold TH1, which is a positive integer. That is, assuming that q is a quantization index value, a first linear approximation is performed when $|q|>TH1$, a second linear approximation is performed when $|q|=TH1$, and a Laplace distribution approximation (described in the above embodiment) is performed when $|q|<TH1$.

Although this modification changes between the linear approximation and the Laplace distribution approximation according to the quantization index values q, the first linear approximation may be applied for all values of q.

Figure 11A:
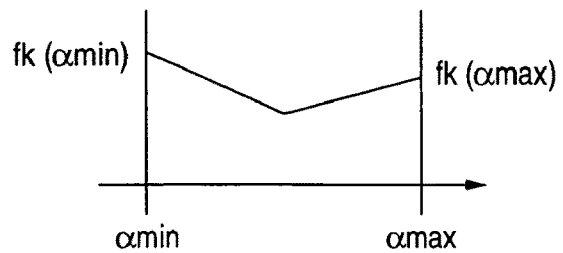
FIG. 11A is a diagram illustrating a polygonal-line approximation.

The first and second linear approximations are the polygonal-line approximations as shown in FIG. 11A.

To begin with, the first linear approximation will be described.

Figure 11B:
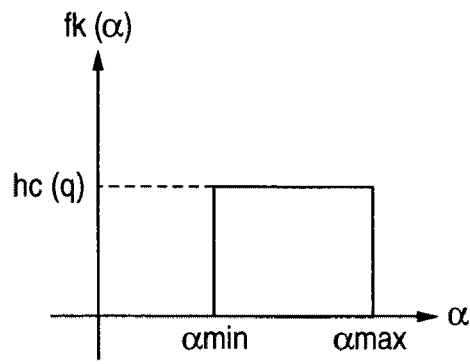
FIG. 11B is a diagram illustrating a polygonal-line approximation.

As shown in FIG. 11B, the non-zero transform coefficient distribution estimating section 524 considers a uniform function $fk(\alpha)$, which satisfies that $fk(\alpha)=hc(q)$ (where, $\alpha min \leq \alpha \leq \alpha max$). This uniform function is then approximated by a polygonal line.

The non-zero transform coefficient distribution estimating section 524 estimates values of $fk(\alpha min)$ and $fk(\alpha max)$ using neighboring histograms $hc(q-1)$ and $hc(q+1)$ shown in FIG. 11A.

For example, a value of fk(αmax) is estimated as follows.

Figure 11C:
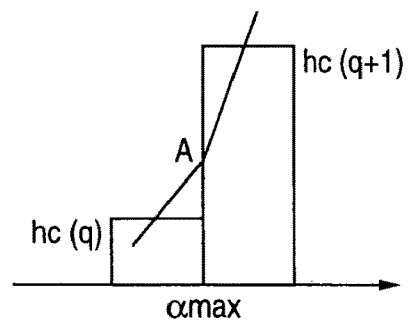
FIG. 11C is a diagram illustrating a polygonal-line approximation.

First, the non-zero transform coefficient distribution estimating section 524 determines a position of a point A as shown in FIG. 11C. Setting the value of fk(αmax) between hc(q) and hc(q+1) is reasonable. For example, it is preferable that fk(αmax)=(hc(q)+hc(q+1))/2.

In this example, a point internally dividing an interval between hc(q) and hc(q+1) by a ratio of hc(q):hc(q+1) is employed as the position of point A.

This is preferable because a value of point A can become sufficiently small when a frequency value hc(q) of the given quantization index is less than a frequency value hc(q+1) of a neighboring quantization index or the frequency value hc(q) of the given quantization index approaches zero.

At that time, the non-zero transform coefficient distribution estimating section 524 can calculates fk(αmax) according to the following equation.

$$fk(\alpha max)=2\times hc(q)\times hc(q+1)/(hc(q)+hc(q+1))$$

Similarly, the non-zero transform coefficient distribution estimating section 524 can calculates fk(αmin) according to the following equation.

$$fk(\alpha min)=2\times hc(q)\times hc(q-1)/(hc(q)+hc(q-1))$$

Next, the non-zero transform coefficient distribution estimating section 524 estimates a value of fk(αmid). Here, shapes of the neighboring histograms are classified into two kinds, which are shown in FIGS. 11D and 11E, respectively.

Figure 11D:
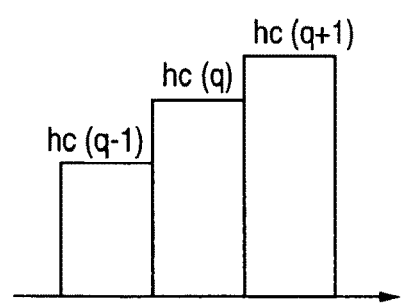
FIG. 11D is a diagram illustrating a polygonal-line approximation.

As shown in FIG. 11D, when the histograms (frequency values) increase or decrease monotonously with respect to the quantization index values q, the non-zero transform coefficient distribution estimating section 524 sets fk(αmid)=hc(q).

Figure 11E:
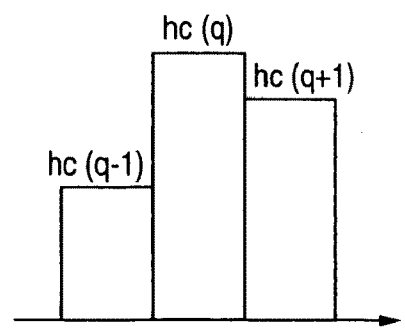
FIG. 11E is a diagram illustrating a polygonal-line approximation.

Further, as shown in FIG. 11E, when histograms (frequency values) does not increase or decrease monotonously with respect to the quantization index values q, the non-zero transform coefficient distribution estimating section 524 calculates fk(αmid) satisfying a condition of fk(αmid)>hc(q) when hc(q) has the maximum value (peak), and calculates fk(αmid) satisfying a condition of fk(αmid)<hc(q) when hc(q) has the minimum value (valley).

More specifically, the non-zero transform coefficient distribution estimating section 524 adds a mean value of a difference between fk(αmin) and fk(αmax). That is, fk(αmid) is calculated according to the following equation.

$$fk(\alpha mid)=hc(q)+(hc(q)-fk(\alpha min)+hc(q)-fk(\alpha max))/2$$

The non-zero transform coefficient distribution estimating section 524 may transform the above-obtained function fk(x) into the probability density function. That is, the probability density function fcq(x) is as follows:

$$fcq(x) = \begin{cases} \frac{fk(x)}{\int_{\alpha min}^{\alpha max} fc(t)dt} & \alpha min \le x < \alpha max \\ 0 & \text{otherwise} \end{cases} \quad (10)$$

Next, the second linear approximation will be described. The second linear approximation is a linear approximation applied when |q|=TH1.

When q=TH1, the left side (a case of q=TH1−1) is approximated by the Laplace distribution unlike the first linear approximation. Therefore, it is desirable that values of fk(αmin) are considered so as to satisfy continuity of the distribution. Accordingly, the non-zero transform coefficient distribution estimating section 524 calculates fk(αmin) according to the following equation.

$$fk(\alpha min) = \qquad (11)$$

$$L((\alpha min + q) \times D(c)) = \frac{1}{\sqrt{2}\,\sigma} \exp\left(\frac{-\sqrt{2}\,|(\alpha min + q) \times D(c)|}{\sigma}\right)$$

In addition, fk(αmax) and fk(αmid) by the second linear approximation are calculated in the same manner as the first linear approximation. Further, the non-zero transform coefficient distribution estimating section 524 calculates fcq(x) using three numerical values, that is, fk(αmin), fk(αmax) and fk(αmid) in the same manner as the first linear approximation.

[Second Modification]

The random numbers are generated for all quantization index values q in the above embodiment.

The second modification shows an example where the random numbers are generated for part of the quantization index values q.

For example, the dequantization-value estimating section 500 cannot estimate the dequantization values only when all differences between the given quantization index value and the neighboring quantization index values are 0. Since a number of quantization index values are distributed in 0 as shown in the histogram of FIG. 6, the possibility that all differences between the given quantization index value and the neighboring quantization index values are 0 as described above becomes high when the given quantization index value is 0.

On the contrary, when the given quantization index values is not 0, since the neighboring quantization index values are very likely to be 0, the possibility that all differences between the given quantization index value and the neighboring quantization index values are 0 becomes low.

As described above, the decoding program 5 in this modification applies the random numbers generated by the random-number generating section 560 as the correction factors α (or the dequantization values) when the given quantization index value q is 0, and applies the correction factors α (or the dequantization values) generated by the dequantization-value estimating section 500 when the given quantization index value q is not 0.

[Third Modification]

The random-number generating section 560 generates the random numbers, which match the function fcq(x), in the above embodiment. Random numbers different from the function fcq(x) are generated in the third modification.

The function fcq(x) is a function distributed between a range of αmin to αmax. Accordingly, if the quantization step size D(c) is large, a distortion caused when random numbers deviated from the expected value of α are generated is likely to become large.

Accordingly, the third modification limits the range of random numbers as described below.

That is, the random-number generating section 560 generates random numbers, which match the following probability density function fcq1(x).

$$fcq1(x) = \begin{cases} \frac{fcq(x)}{\int_{E(\alpha Tcq)-d}^{E(\alpha Tcq)+d} fcq(t)dt} & E(\alpha Tcq)-d \le x \le E(\alpha Tcq)+d \\ 0 & x < E(\alpha Tcq)-d, x > E(\alpha Tcq)+d \end{cases} \quad (12)$$

where $E(\alpha Tcq)$ is an expected value of fcq(x). In this manner, the expected value may be calculated. Alternatively, for the sake of simple calculation, it may be preferable that $E(\alpha Tcq)=0$. In addition, a range of d is limited such that $\alpha min \leq E(\alpha Tcq)-d$ and $E(\alpha Tcq)+d \leq \alpha max$.

The above equation is an example of taking a generation probability in the neighborhood as 0 using only a center shape (−d to d) of fcq(x). By doing so, since values deviated from the expected value are not output, it is possible to limit a square error.

[Fourth Modification]

In a fourth modification, random numbers different from fcq(x) are generated.

There may be a case where load on the random number generating process by the inverse function method as shown in the above embodiment is great.

Accordingly, the random-number generating section 560 in the fourth modification generates uniform random numbers. Further, in this modification, for the sake of convenience of description, a variance of the Laplace distribution when the distribution of transform coefficients are estimated by the Laplace distribution and the transform coefficient kind c is estimated by the Laplace distribution is assumed as σ(c).

That is, the random-number generating section 560 in this modification generates the random numbers according to the following probability density function fcq2(x).

$$fcq2(x)=1/(2\beta\sigma), \text{ if } E(\alpha Tcq)-\beta\sigma \leq x \leq E(\alpha Tcq)+\beta\sigma$$

$$fcq2(x)=0, \text{ otherwise}$$

Where $E(\alpha Tcq)$ is the expected value of fcq(x). This expected value may be calculated. Alternatively, for the sake of simple calculation, it may be preferable that $E(\alpha Tcq)=0$.

Considering that $E(\alpha Tcq)=0$, the probability density function fcq2(x) is a uniform distribution function in a range of [−βσ, βσ]. A value β is set such that a range of [$E(\alpha Tcq)-\beta\sigma$, $E(\alpha Tcq)+\beta\sigma$] does not exceed [αmin, αmax].

The value β is a parameter to control disorder of a decoded image. Increase of β leads to increase of disorder of an image. Decrease of β leads to decrease of disorder of an image, however, results in an image having visible block distortion.

[Fifth Modification]

While the case in which the invention is applied to the JPEG has been described in the above embodiment and the above modifications, the invention is not limited thereto. In the fifth modification, an example in which the invention is applied to the JPEG2000 will be described. Hereinafter, a difference between the application of the invention to the JPEG2000 and the application of the invention to the JPEG will be described.

In the application of the invention to the JPEG2000, the range of α is as follows:

$$-1 \leq \alpha 1, \text{ when } Q(c,i,j)=0$$

$$0 \leq r+\alpha \leq 1, \text{ when } Q(c,i,j)>0$$

$$-1 \leq -r+\alpha \leq 0, \text{ when } Q(c,i,j)<0$$

Figure 12:
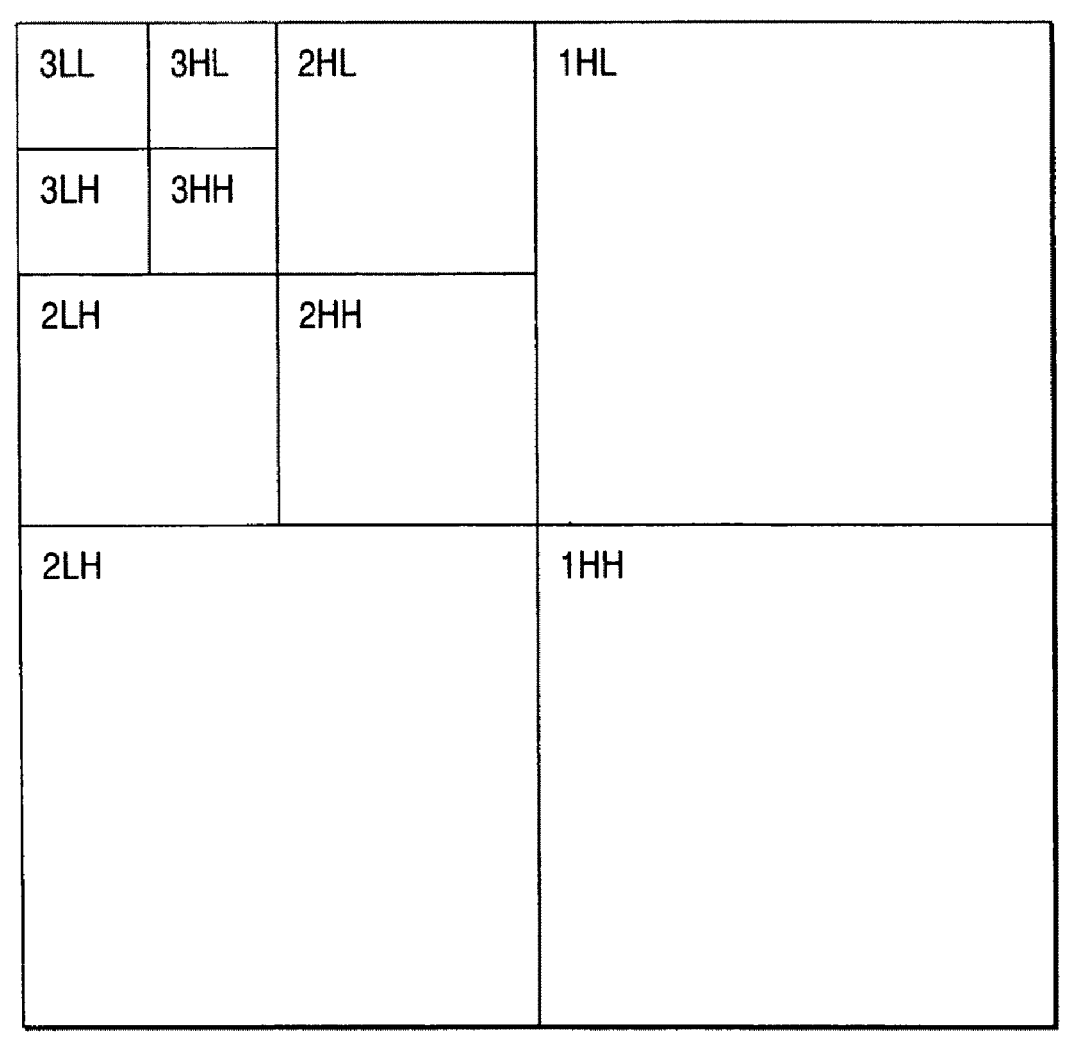

Further, in the JPEG2000, each transform coefficient exists in a frequency domain decomposed as shown in FIG. 12. Here, α(x, y) is defined as follows. Where, NL is the number of decomposition levels of a wavelet transform.

σ(1, 3)=σ of a coefficient of NHL
σ(3, 1)=σ of a coefficient of NLH
σ(3, 3)=σ of a coefficient of NHH . . .
σ(2, 6)=σ of a coefficient of (N−1)HL
σ(6, 2)=σ of a coefficient of (N−1)LH
σ(6, 6)=σ of a coefficient of (N−1)HH . . .

That is, it may be generalized as follows.

$$\sigma(2^{NL-N}, 3 \times 2^{NL-N}) = \sigma \text{ of } nHL$$

$$\sigma(3 \times 2^{NL-N}, 2^{NL-N}) = \sigma \text{ of } nLH$$

$$\sigma(3 \times 2^{NL-N}, 3 \times 2^{NL-N}) = \sigma \text{ of } nHH \tag{13}$$

The above values σ may be standard deviations of simple signals or may be results caused by the estimation of the Laplace distribution as described in the above embodiment. As shown in FIG. 12, the values σ are relatively arranged on an x-y plane around a range on a two-dimensional frequency domain of each transform coefficient.

The zero transform coefficient distribution estimating section 526 calculates the values σ corresponding to the zero transform coefficients by approximating the values σ by an exponential function.

Second Embodiment

Next, a second embodiment will be described.

In the second embodiment, a distribution determining method different from that in the first embodiment will be described. More specifically, in the second embodiment, the values σ are obtained by calculating a standard deviation of the quantization indexes Q(c, i, j) for each quantization coefficient kind c. Meanwhile, the decoding program 5 in the second embodiment has a configuration shown in FIG. 4.

The distribution estimating section 520 in the second embodiment estimates a using an established function $F_+(x, \sigma)$ or $F_-(x, \sigma)$. $F_+(x, \sigma)$ or $F_-(x, \sigma)$, which is an integral function of the Laplace distribution, is expressed by the following equation.

$$F_+(x, \sigma) = \frac{1}{2}\left[1 - \exp\left(-\frac{\sqrt{2}}{\sigma}x\right)\right] \tag{14}$$

$$F_-(x, \sigma) = \frac{1}{2}\left[1 - \exp\left(\frac{\sqrt{2}}{\sigma}x\right)\right]$$

This function can express σ as a positive function of x and y for an equation having a form of $y=F_+(x, \sigma)$ or $F_-(x, \sigma)$. That is, the standard deviation σ can be obtained without performing a numerical calculation (repeated calculations). This gives an advantage of this embodiment over the first embodiment.

Here, a normalized histogram of the quantization indexes q is set as H(q).

In this embodiment, given any integer N, the standard deviation σ, which makes the sum of normalized histograms having a range of the quantization indexes q from −N to N equal to a corresponding integral value of the Laplace distribution, is obtained.

When the quantization step size is D, a range of coefficients in which q falls within the range of −N to N is −(2N+1)D/2 to (2N+1)D/2 in the JPEG.

Making the sum of normalized histograms having the range of the quantization indexes q from −N to N equal to the corresponding integral value of the Laplace distribution can be achieved according to the following equation.

$$F_+\left(\frac{(2N+1)D}{2}\right) + F_-\left(-\frac{(2N+1)D}{2}\right) = \sum_{q=-N}^{N} H(q) \tag{15}$$

From the symmetrical property of the Laplace distribution, the above equation can be transformed into the following equation.

$$2F_+\left(\frac{(2N+1)D}{2}\right) = \sum_{q=-N}^{N} H(q) \quad (16)$$

Solving Equation 16 for σ, the following equation is obtained.

$$\sigma = -\frac{(2N+1)D}{\sqrt{2}\log\left[1 - \sum_{q=-N}^{N} H(q)\right]} \quad (17)$$

The distribution estimating section 520 obtains the standard deviation σ using Equation (17).

[First Modification]

Hereinafter, modifications of the second embodiment will be described.

As a first modification, an application of the second embodiment to the JPEG2000 will be described. In the JPEG2000, a range of coefficients in which q has a range of −N to N is −(N+1)D to (N+1)D. Making the sum of normalized histograms having the range of q from −N to N equal to the corresponding integral value of the Laplace distribution can be achieved according to the following equation.

$$F_+((N+1)D) + F_-(-(N+1)D) = 2F_+((N+1)D) = \sum_{q=-N}^{N} H(q) \quad (18)$$

[Second Modification]

While the integer N is a preset value (that is, an applied value) in the second embodiment, the decoding program 5 sets an appropriate integer N in a second modification.

Here, a method of determining the integer N as a linear function of the maximum value of the quantization indexes q will be described by way of examples.

First, integers a and b are prepared in advance.

(1) The maximum value of absolute values of the quantization indexes q is assumed as qM. That is, it is assumed that qM=max {|qmax|, |qmin|}.

(2) When qM is 0, no process is performed.

(3) N is obtained with N=min{qM−1, round(a×qM+b)}

In these equations, max {A, B} represents a function to output larger one of A and B and min{A, B} represents a function to output smaller one of A and B. In addition, the minimum value and maximum value of q are assumed as qmin and qmax, respectively. round( ) represents a rounding off process such as rounding-off or rounding out six and larger and disregarding the remaining.

In the item (3), the reason why the minimum value of qM−1 and round (a×qM+b), which is an output value of the linear function, is taken is that a cannot be obtained because a denominator of Equation (17) to calculate a becomes 0 when N=qM. That is, the maximum of N is processed to become qM−1.

Figure 13:
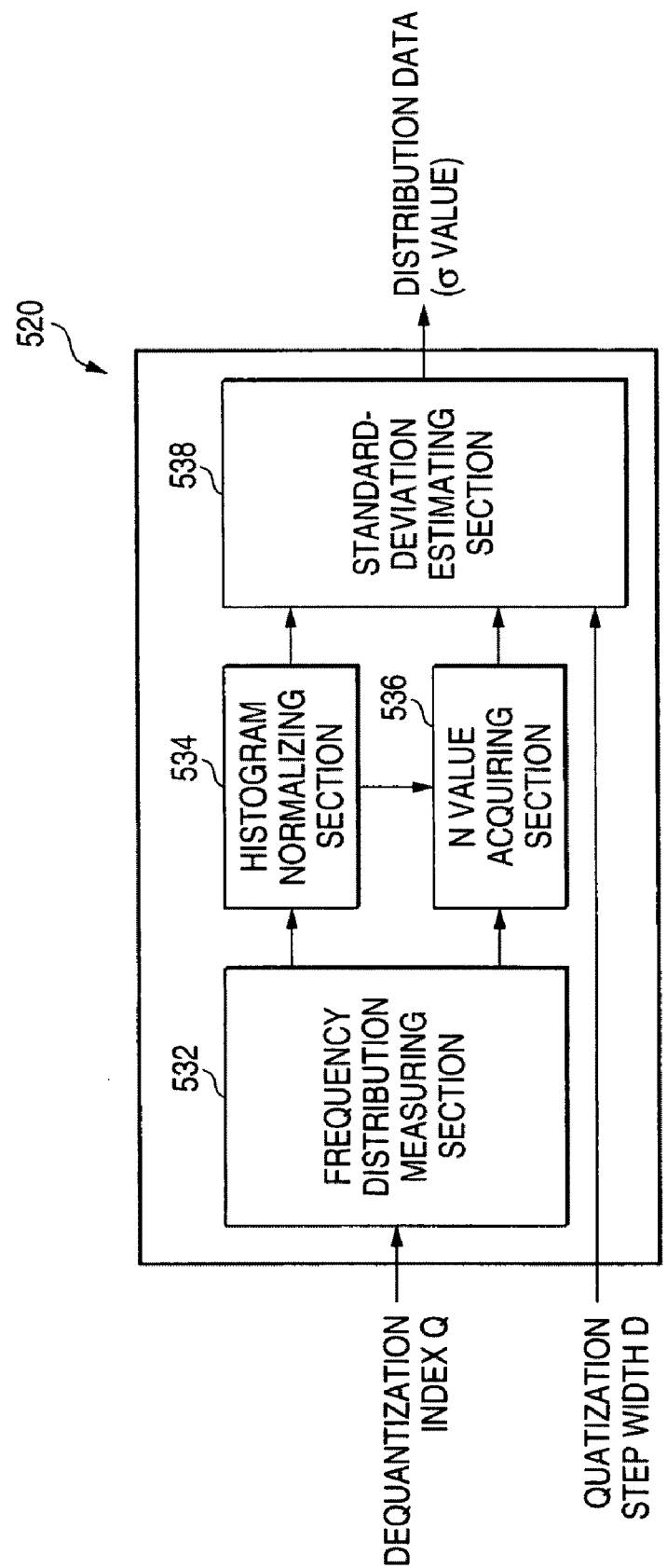
FIG. 13 is a diagram illustrating a distribution estimating section 520 in a second embodiment in more detail.

FIG. 13 is a diagram illustrating the configuration of the distribution estimating section 520 in the second embodiment in more detail.

A shown in FIG. 13, the distribution estimating section 520 includes a frequency distribution measuring section 532, a histogram normalizing section 534, an N value acquiring section 536 and a standard-deviation estimating section 538.

In the distribution estimating section 520, the frequency distribution measuring section 532 measures a frequency distribution h(q) based on input quantization indexes Q(i) (where, i=1, 2, . . . ). The frequency distribution h(q) represents the number of values of the quantization indexes Q(i), which are q.

Further, the frequency distribution measuring section 532 acquires the maximum value qM of the absolute values of the quantization index values q.

The histogram normalizing section 534 normalizes the frequency distribution h(q) measured by the frequency distribution measuring section 532 and generates a normalized histogram H(q).

The N value acquiring section 536 determines a value of N based on qM acquired by the frequency distribution measuring section 532. Specifically, the N value acquiring section 536 performs the above-mentioned processes (1) to (3).

The standard-deviation estimating section 538 calculates the standard deviation σ based on the value of N acquired by the N value acquiring section 536, the normalized histogram H(q) generated by the histogram normalizing section 534, and the quantization step size D input from outside.

An experimental result when the value of N is set as described above is shown in FIG. 14.

Figure 14:
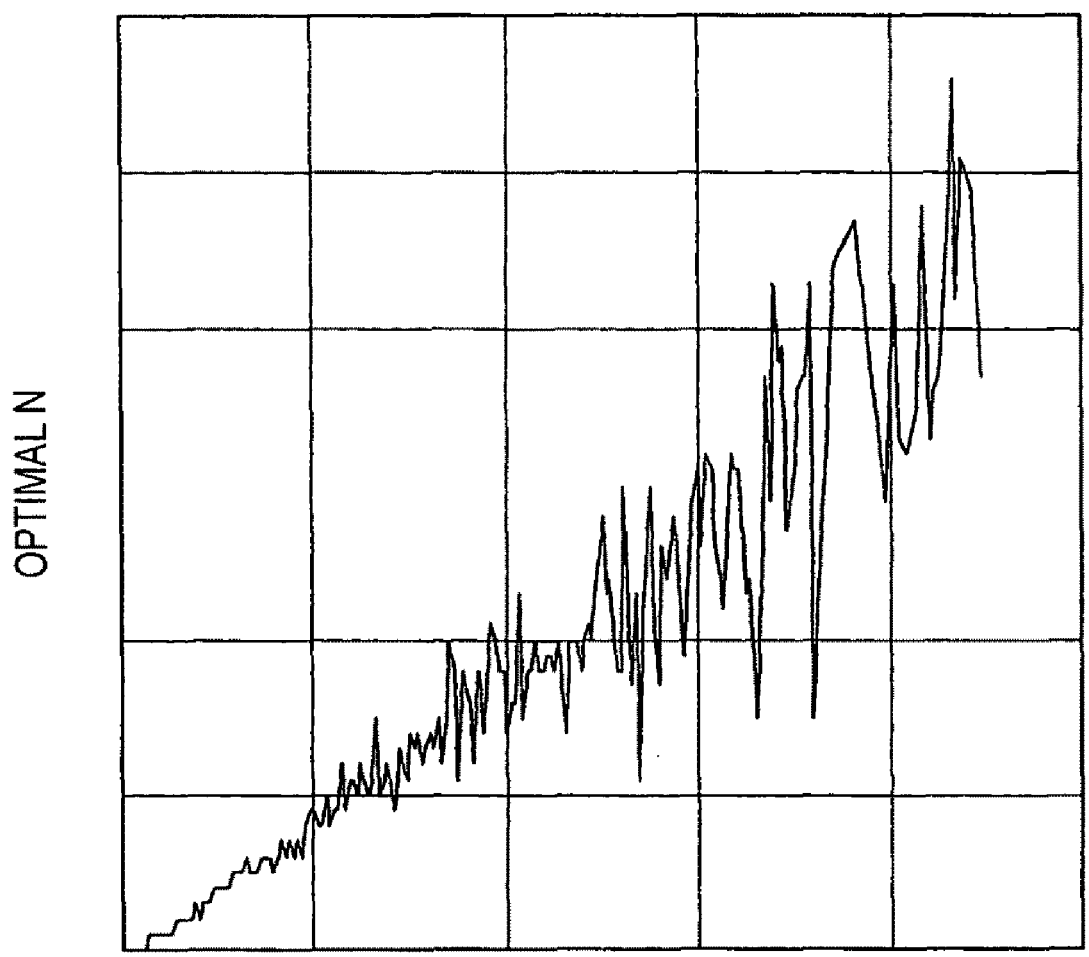
FIG. 14 is a graph showing a relationship between the maximum value of quantization values and an optimal N value.

Various images are transformed by DCT and the maximum value of the quantization indexes after quantization is obtained. Also, a standard deviation of transform coefficients of a original image is obtained, σ is calculated using various values of N, and then, a value of N most appropriate to estimate the standard deviation of the transform coefficients is obtained. FIG. 14 shows a relationship between the maximum value of quantization values and the optimal value of N. As shown in FIG. 14, there is a linear relationship between qM and the optimal value of N.

Accordingly, a significant effect of obtaining N using the linear function of qM as in this method can be achieved.

Further, the value of N may be obtained with assuming that b=0 and N=min{qM−1, round(a×qM)}.

That is, as shown in FIG. 14, since the relationship between qM and the optimal value of N is linear nearly passing an original point, b may be limited to zero.

In the above description, with the maximum value of the absolute values of the quantization indexes q as qM, N is obtained using the linear function of qM. However, it is not indispensable to set qM as the maximum value of the absolute values of the quantization indexes. qmax or qmin may be also used as qM.

This is because the distribution of quantization indexes is approximately symmetrical and a relationship of qmax=−qmin is almost established. That is, it is not necessary to use the maximum value of the absolute values.

Further, in the above description, the value of N is obtained by applying the rounding off process using the round ( ) function to an output of the linear function. A rounding-down process or a rounding-out process may be employed in order to obtain the integer value N.

Furthermore, although a range of addition of the frequency distribution is −N to N in the above description, such a symmetrical range may not be employed. For example, the range may be Nmin to Nmax, where Nmin≤0 and Nmax≤0. For example, Nmin may be obtained as a function of qmin and Nmax may be obtained as a function of qmax.

[Third Modification]

In a third modification, estimation is made using a value of N, which makes an accumulated value of H(q) to be a certain value P(0<P<1). That is, the N value acquiring section 536 in the third modification obtains N by giving a preset value P as expressed by the following equation.

$$N = \underset{N}{\mathrm{argmin}} \left| \left\{ \sum_{q=-N}^{N} H(q) \right\} - P \right| \qquad (19)$$

More specifically, the following operation is performed with using the configuration as shown in FIG. 13.

Data input to the distribution estimating section 520 is the quantization index Q(i) (where, I=1, 2, . . . ) and the quantization step size D.

The frequency distribution measuring section 532 measures the frequency distribution h(q) based on the input quantization index Q(i). h(q) represents the number of values of quantization indexes Q(i), which are q.

At the same time, the frequency distribution measuring section 532 acquires the maximum value qM of the absolute values of the quantization index values q.

Next, the histogram normalizing section 534 generates the normalized histogram H(q) based on the frequency distribution h(q) measured by the frequency distribution measuring section 532.

The N value acquiring section 536 determines the value of N based on the normalized histogram H(q) generated by the histogram normalizing section 534 and qM acquired by the frequency distribution measuring section 532. In addition, the value P is a preset value.

Figure 15:
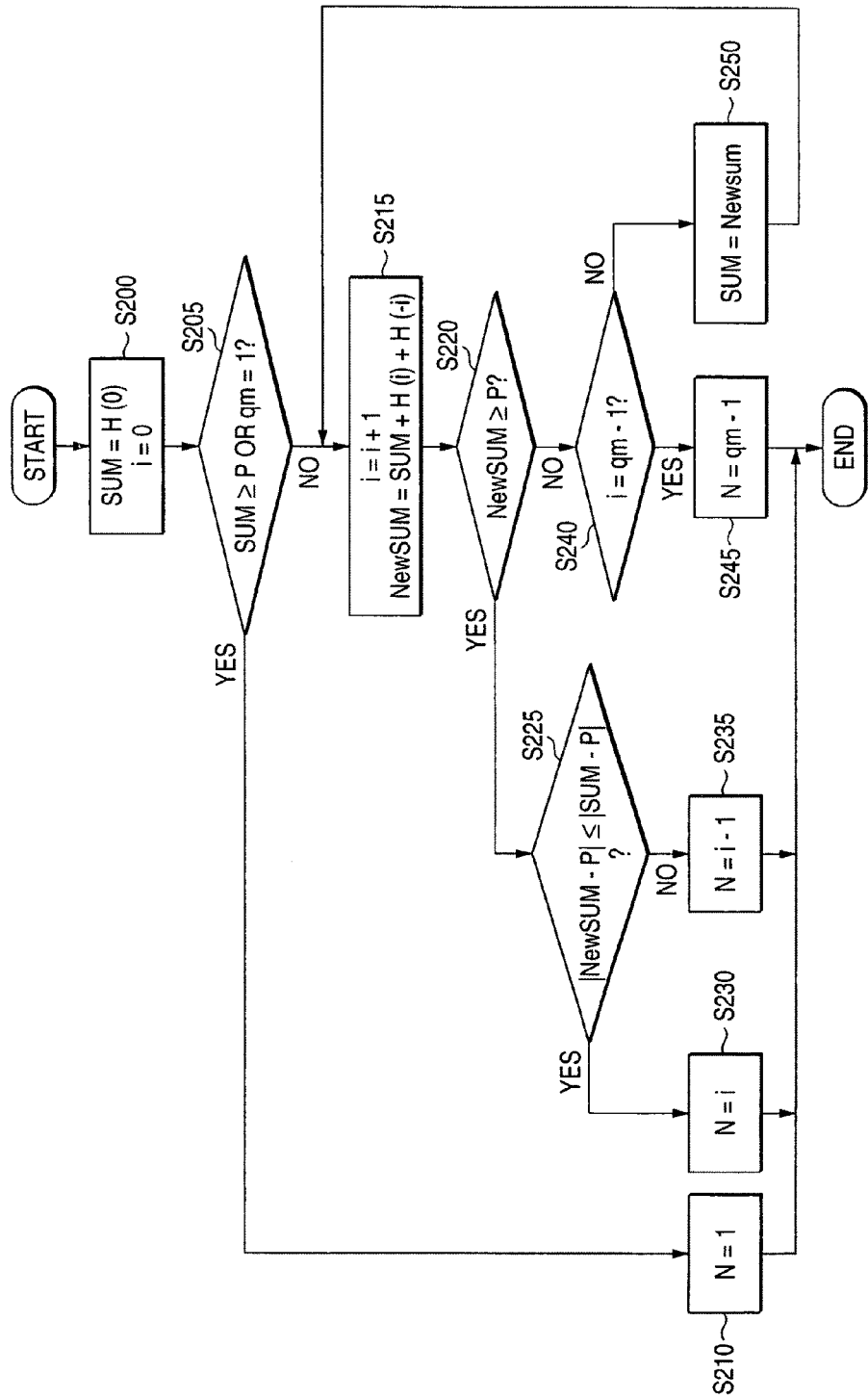
FIG. 15 is a flow chart of an N value determining process.

More specifically, the N value acquiring section 536 determines the value of N according to the flow chart as shown in FIG. 15. Further, qm in the flow chart of FIG. 15 indicates the maximum value (qM) of the absolute values of q. Furthermore, SUM indicates an accumulated value (accumulated frequency) of the frequency value H(q).

First, the N value acquiring section 536 sets SUM=H(0) and i=0 (S200).

Next, the N value acquiring section 536 sets N=1 and terminates the process (S210) if SUM≧P or qm=1 (S205: Yes) and otherwise (S205: No), increments a value of i by one and sets NewSUM=SUM+H(i)+H(−i) (S215). That is, the N value acquiring section 536 expands the range of accumulation of the frequency value by one in the left and right, respectively.

The N value acquiring section 536 sets N=i and terminates the process (S230) if NewSUM≧P (S220: Yes) and |NewSUM−P|≦|SUM−P| (S225: Yes). Also, the N value acquiring section 536 sets N=i−1 and terminates the process (S235) if NewSUM≧P (S220: Yes) and |NewSUM−P|>|SUM−P| (S225: No).

On the other hand, the N value acquiring section 536 sets N=qm−1 and terminates the process (S245) if NewSUM<P (S220: No) and i=qm−1 (S240: Yes). Also, the N value acquiring section 536 substitutes a value of NewSUM into SUM (S250) and returns to S215 if NewSUM<P (S220: No) and unless i=qm−1 (S240: No).

The N value acquiring section 536 determines the value of N according to the above process.

In addition, as shown in the above-described flow chart, since a value of ΣH(q) is completed to be calculated, the N value acquiring section 536 outputs the following equation, which is a result of addition of the normalized histogram, to the standard-deviation estimating section 538.

$$\sum_{q=-N}^{N} H(q) \qquad (20)$$

Using the equations shown in the second embodiment, the standard-deviation estimating section 538 calculates the standard deviation σ based on the value of N input from the N value acquiring section 536, the result of addition of the normalized histogram H(q), and the quantization step size D input from outside.

As described above, an example of a result when the standard deviation is estimated is shown as below.

A root mean square error (RMSE) between the standard deviation of original transform coefficients measured for various images, color components and quantization step sizes and the estimated standard deviation is calculated.

When the value of N is determined according to the method shown in the second modification, RMSE is 4.176.

In addition, when the value of N is determined according to the method shown in the third modification, RMSE is 4.033.

In this manner, the method shown in the above modifications can estimate the standard deviation accurately.

Further, the method in this embodiment does not require a numerical calculation as in the conventional technique, and accordingly, can stably perform a high-speed calculation without falling in a local solution.

Figure 16:
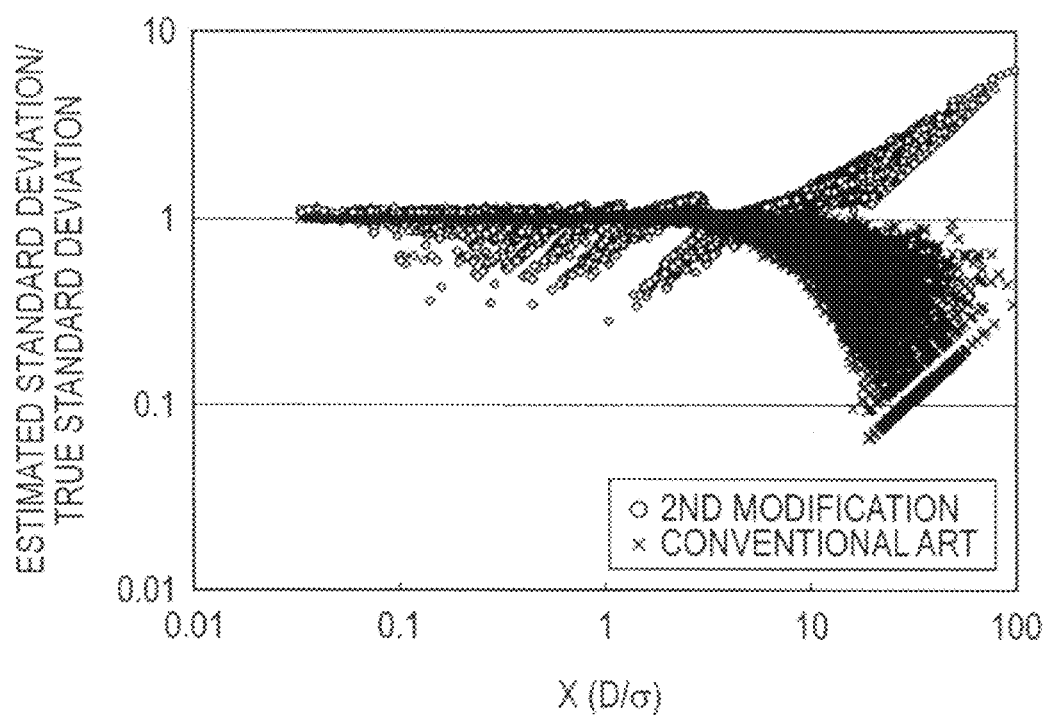
FIG. 16 is a graph showing a ratio of a standard deviation of original transform coefficients to an estimated standard deviation.

FIG. 16 shows the ratio of the standard deviation of original transform coefficients measured for various images, color components and quantization step sizes to the estimated standard deviation. Since a vertical axis represents a ratio of an estimated standard deviation/a true standard deviation, a ratio approaching 1 indicates a good performance.

When a value of X is large, it can be seen from FIG. 16 that the second modification provides an excellent method showing good performance while a conventional example shows poor performance with significantly deteriorated values.

In addition, when the value of X is small, a method of the conventional example is relatively good. Moreover, when the value of X is large, the second or third modification is good.

[Fourth Modification]

Accordingly, in a fourth modification, the method disclosed in JP 2004-80741 A (that is, the conventional example) is applied when the value of X=D/σ is small, and the second or third modification is applied when the value of X is large.

In this case, since a true value of σ is unknown, the distribution estimating section 520 first estimates a with the same method as the second or third modification, evaluates a value of X using the estimated σ, employs a estimated according to the method of the conventional example when X is smaller than a preset threshold, and employs σ estimated according to the second or third modification when X is larger than the preset threshold.

Further, the distribution estimating section 520 estimates a using the second or third modification when the maximum value of the quantization indexes (or the maximum value of the absolute values) is smaller than a preset threshold and estimates a using the method of the conventional example when the maximum value of the quantization indexes (or the maximum value of the absolute values) is larger than the preset threshold.

Furthermore, the distribution estimating section 520 may calculate and apply an intermediate value of σ between the value of σ calculated by the method of the conventional example and the value of σ calculated by the second or third modification.

That is, as shown in FIG. 16, since a value smaller than an actual standard deviation is often calculated in the method of the conventional example and a value larger than the actual standard deviation is often calculated in the second or third modification, the distribution estimating section 520 can integrate these calculation results to take the intermediate value of σ, thereby obtaining a value of σ closer to the actual standard deviation.

More specifically, assuming that the standard deviation calculated by the method of the conventional example is A and the standard deviation calculated by the second or third modification is B, the distribution estimating section 520 calculates a final standard deviation σ according to the following equation. In this equation, a constant c is a preset value.

$$\sigma = (AB^c)^{\frac{1}{1+c}} \quad (21)$$

Figure 17:
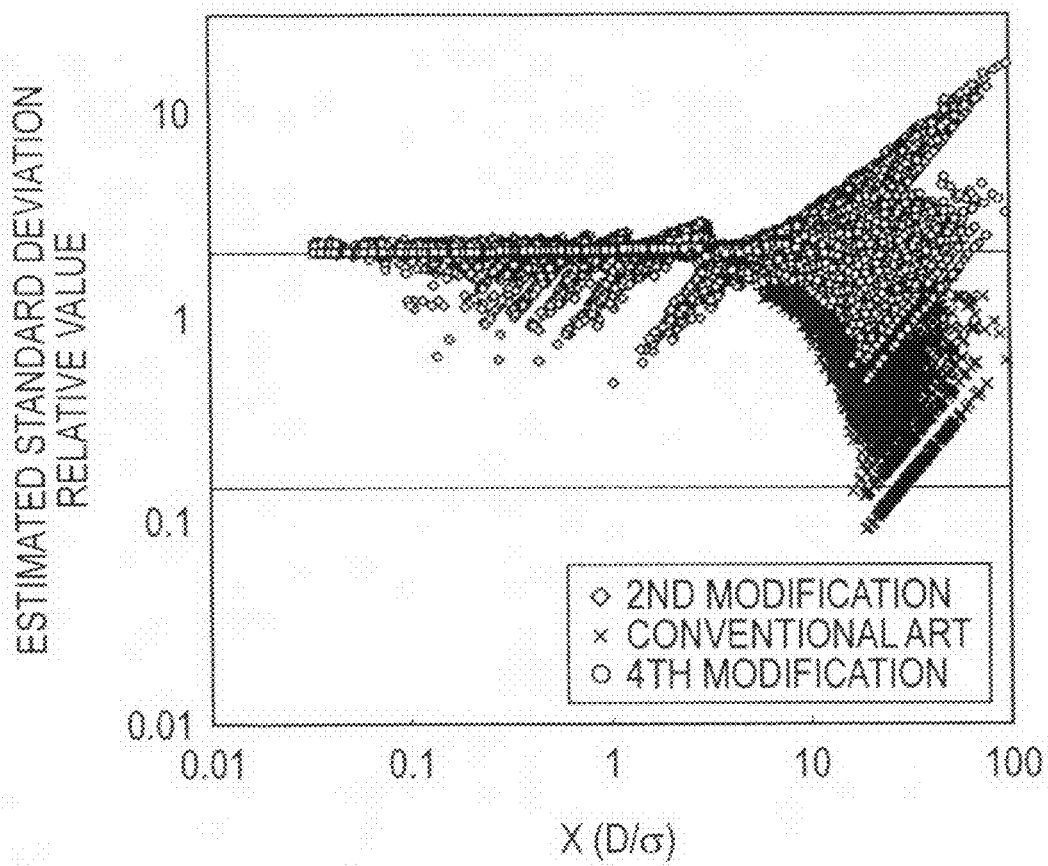
FIG. 17 is a diagram showing a ratio of a standard deviation of original transform coefficients to an estimated standard deviation when a fourth modification is applied.

For example, when c=1, the final standard deviation σ becomes a geometrical mean of the standard deviation A and the standard deviation B. A result when c=1 is shown in FIG. 17. An estimated standard deviation relative value on a vertical axis indicates a value of an estimated standard deviation value/a true standard deviation value.

As shown in FIG. 17, precision of estimation has been further improved in the fourth modification.

For the fourth modification, RMSE=SQRT (a mean value of square of difference between the true standard deviation and the estimated standard deviation) is calculated. Where, SQRT( ) is a function to calculate a square root.

RMSE in the conventional example: 2.26
RMSE in the fourth modification: 1.22

It can be seen from the above results that an efficiency (precision) of the fourth modification is excellent.

What is claimed is:

1. A distribution determining method comprising:
   classifying quantization indexes according to an attribute;
   estimating the distribution of classified quantization indexes with the attribute by:
   adding values of frequency of the respective quantization indexes;
   calculating at least one of a variance of a Laplace distribution and a standard deviation of the Laplace distribution so that when a Laplace distribution function is integrated so that an integral range of a right side is equal to an integral range of a left side with using a maximum frequency position of the Laplace distribution as a reference, a resultant value of the addition of values of frequency is equal to an integral value; and
   prior to calculating at least one of the variance and the standard deviation, a frequency distribution of the Laplace distribution is normalized through a normalizing process, which generates a normalized histogram; and
   estimating the distribution of classified quantization indexes without the attribute based upon using the distribution of the classified quantization indexes with the attribute.

2. The distribution determining method according to claim 1, wherein the values of frequency of the respective quantization indexes are added so that an addition range on a right side is equal to an addition range on a left side with using a maximum value of frequency in frequency distribution of the quantization indexes as a reference.

3. The distribution determining method according to claim 1, further comprising:
   determining a range within which the values of frequency are added, on a basis of a maximum value of absolute values of the quantization indexes.

4. The distribution determining method according to claim 3, further comprising:
   substituting the maximum value of absolute values of the quantization indexes into a preset linear function;
   rounding off a value obtained from the linear function to obtain an integer; and
   setting the obtained integer as the range within which the values of frequency are added.

5. The distribution determining method according to claim 1, wherein the attribute is a kind of transform coefficient.

6. The distribution determining method according to claim 1, wherein the attribute is a non-zero transform coefficient.

* * * * *